US010805628B2

(12) United States Patent
Ma et al.

(10) Patent No.: US 10,805,628 B2
(45) Date of Patent: Oct. 13, 2020

(54) MOTION VECTOR DECODING METHOD AND DECODER

(71) Applicant: HUAWEI TECHNOLOGIES CO., LTD., Shenzhen, Guangdong (CN)

(72) Inventors: Xiang Ma, Shenzhen (CN); Haitao Yang, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/440,941

(22) Filed: Jun. 13, 2019

(65) Prior Publication Data

US 2019/0297342 A1 Sep. 26, 2019

Related U.S. Application Data

(63) Continuation of application No. PCT/CN2017/098648, filed on Aug. 23, 2017.

(30) Foreign Application Priority Data

Dec. 15, 2016 (CN) .......................... 2016 1 1162229

(51) Int. Cl.
*H04N 19/137* (2014.01)
*H04N 19/513* (2014.01)
(Continued)

(52) U.S. Cl.
CPC ......... *H04N 19/513* (2014.11); *H04N 19/137* (2014.11); *H04N 19/176* (2014.11); *H04N 19/52* (2014.11); *H04N 19/61* (2014.11)

(58) Field of Classification Search
None
See application file for complete search history.

(56) References Cited

U.S. PATENT DOCUMENTS 10,104,361 B2 * 10/2018 Budagavi ............. H04N 19/117
10,645,362 B2 * 5/2020 Abbas .................. H04N 13/243
(Continued)

FOREIGN PATENT DOCUMENTS

CN 101667295 A 3/2010
CN 102611826 A 7/2012
(Continued)

OTHER PUBLICATIONS

ITU-T H.263 Implementors'Guide, Series H: Audiovisual and Multimedia Systems Coding of moving video, Implementors Guide for H.263: "Video coding for low bit rate communication", Aug. 5, 2005, 10 pages.

(Continued)

*Primary Examiner* — Shadan E Haghani
(74) *Attorney, Agent, or Firm* — Womble Bond Dickinson (US) LLP

(57) ABSTRACT

A motion vector decoding method includes: determining a prediction motion vector of a to-be-decoded unit based on a motion vector of a prediction unit of the to-be-decoded unit; when a face image in which the to-be-decoded unit is located and at least one of a face image in which a first reference unit is located and a face image in which the prediction unit is located are not face images in a same orientation, performing a first update on the prediction motion vector, where the first update is used to determine a mapping vector that is of the prediction motion vector and that is in a plane of the face image in which the to-be-decoded unit is located; and obtaining a motion vector of the to-be-decoded unit based on the prediction motion vector obtained after the first update.

20 Claims, 9 Drawing Sheets

(51) Int. Cl.
*H04N 19/176* (2014.01)
*H04N 19/61* (2014.01)
*H04N 19/52* (2014.01)

(56) References Cited

U.S. PATENT DOCUMENTS

| | | | |
|---|---|---|---|
| 2012/0189167 A1 | 7/2012 | Kurata et al. | |
| 2013/0176390 A1* | 7/2013 | Chen | H04N 19/597 348/43 |
| 2015/0208083 A1 | 7/2015 | Koo et al. | |
| 2015/0264259 A1 | 9/2015 | Raghoebardajal et al. | |
| 2018/0007387 A1* | 1/2018 | Izumi | H04N 19/132 |
| 2018/0359487 A1* | 12/2018 | Bang | H04N 19/119 |

FOREIGN PATENT DOCUMENTS

| | | |
|---|---|---|
| CN | 104429078 A | 3/2015 |
| CN | 105898339 A | 8/2016 |
| CN | 105959702 A | 9/2016 |
| WO | 2016/064862 A1 | 4/2016 |

OTHER PUBLICATIONS

ITU-T H.264, Series H: Audiovisual and Multimedia Systems, Infrastructure of audiovisual services—Coding of moving video, Advanced video coding for generic audiovisual services. Oct. 2016, 804 pages.

Ma X et al: "Co-projection-plane based motion compensated prediction for cubic format VR content", The Joint Video Exploration Team of ISO/IEC JTC1/SC29/WG11 and ITU-T SG.16, JVET-D0061, Oct. 5, 2016, XP030150294. total 4 pages.

Sauer Jet al: "Geometry correction for motion compensation of planar-projected360VR video", The Joint Video Exploration Team of ISO/IEC JTC1/SC291WG11 and ITU-T SG.16, JVET-D0067, Oct. 5, 2016. XP030150300. total 12 pages.

Li Li et al: "Projection based advanced motion model for cubic mapping for 360-degree video", 2017 IEEE International Conference on Image Processing (ICIP), IEEE, Sep. 17, 2017 (Sep. 17, 2017), pp. 1427-1431, XP033322810, total 6 pages.

* cited by examiner m n r s t u

MOTION VECTOR DECODING METHOD AND DECODER

CROSS-REFERENCE TO RELATED APPLICATIONS

This application is a continuation of International Application No. PCT/CN2017/098648, filed on Aug. 23, 2017, which claims priority to Chinese Patent Application No. 201611162229.0, filed on Dec. 15, 2016. The disclosures of the aforementioned applications are hereby incorporated by reference in their entireties.

TECHNICAL FIELD

The present application relates to the field of computer technologies, and in particular, to a motion vector decoding method and a decoder.

BACKGROUND

A current video encoding technology mainly includes phases such as intra-frame prediction, inter-frame prediction, transformation, quantization, entropy encoding, and de-blocking filtering. At present, a Merge technology and an advanced motion vector prediction (AMVP) technology are both motion vector encoding technologies that are more widely applied currently, in which during encoding, an adjacent block of a to-be-encoded block often needs to be determined, and then a motion vector of the to-be-encoded block is encoded based on a motion vector (MV) of the adjacent block. As a panoramic video (also referred to as a virtual reality (VR) video) develops, an encoding technology is faced with new challenges.

An image in a panoramic video approximates a spherical panorama image after being processed. For ease of encoding, usually the three-dimensional panorama image needs to be converted into a two-dimensional plane. A practice more commonly used at present is to convert the three-dimensional panorama image into a geographic map. However, areas in the geographic map adjacent to the north and south poles are stretched, leading to severe distortion and data redundancy. To avoid the distortion and the data redundancy, a person skilled in the art is trying to map a pixel in the panorama image to a surface of a regular polyhedron, to represent the panorama image by using several equally-sized polygon planar images. As shown in FIG. 1, a part a shows that a regular tetrahedron surrounds a panorama image, a part b shows that a regular hexahedron surrounds a panorama image, a part c shows that a regular octahedron surrounds a panorama image, a part d shows that a regular dodecahedron surrounds a panorama image, and a part e shows that a regular icosahedron surrounds a panorama image. The surface of the polyhedron is expanded into a two-dimensional planar image. A part f shows a two-dimensional planar image obtained by expanding the regular tetrahedron, a part g shows a two-dimensional planar image obtained by expanding the regular hexahedron, a part h shows a two-dimensional planar image obtained by expanding the regular octahedron, a part i shows a two-dimensional planar image obtained by expanding the regular dodecahedron, and a part j shows a two-dimensional planar image obtained by expanding the regular icosahedron.

A specific process of mapping the pixel in the panorama image to the surface of the regular polyhedron is as follows: The panorama image is surrounded by the polyhedron; a line connects a center of sphere of the panorama image to a pixel in the panorama image and extends to intersect at the surface of the polyhedron, where a pixel value of an intersecting point is equal to a pixel value of the pixel; and such a mapping operation is performed on all pixels in the panorama image. If another pixel in the polyhedron is not mapped to a pixel value, a pixel value of the another pixel may be obtained through interpolation with reference to a pixel value of a pixel around the another pixel (it may be understood that, to obtain a pixel value of a pixel in the polyhedron, a line may connect the pixel to a center of sphere to intersect at a point in the panorama image, and then a pixel value of the point is used as the pixel value of the pixel). A mapping process in a hexahedron is used as an example. A panorama image is internally tangent at a hexahedron ABCDEFGH in FIG. 2. To obtain a pixel value of a position of a point M' in the polyhedron, a line connects a center of sphere O to M', and intersects at a point M on a spherical surface, so that a pixel value of the point M is the pixel value of the point M'. According to the method, pixel values of all pixels in a face ABCD in a plane A'B'C'D' can be obtained, and the pixels in the face ABCD form a face image. The plane A'B'C'D' is referred to as a projection plane of the face ABCD. Similarly, a face image and a projection plane that correspond to another face of the hexahedron can be obtained.

A face image of each face of the hexahedron is expanded to splice into a two-dimensional planar image. As shown in FIG. 3, a two-dimensional plane of a part n may be obtained through splicing by expanding a hexahedron of a part m. A top face image on a surface of the hexahedron becomes a face image in an upper left corner of the two-dimensional planar image, a bottom face image becomes a face image in a lower left corner of the two-dimensional planar image, and a front face image, a right face image, a rear face image, and a left face image are shown in the part n. Details are not described herein. In an image encoding and decoding process, a rectangular image is often used as an encoding and decoding object. Therefore, a part in a smallest rectangle surrounding the two-dimensional planar image except the two-dimensional planar image may be directly filled with black, gray, white, or the like. In addition, these face images may also be directly spliced into a rectangular two-dimensional planar image, to avoid a filling operation.

In the prior art, geometric transformation may be performed for a plurality of times in a process of obtaining a two-dimensional planar image from a spherical panorama image and a face image of a polyhedron. The process causes geometrical distortion between adjacent face images. The geometrical distortion affects a correlation between MVs of adjacent blocks. Consequently, MV prediction information of a to-be-decoded unit obtained based on the MVs of the adjacent blocks is inaccurate, finally affecting encoding efficiency.

SUMMARY

Related technologies that may be used in embodiments of the present application are briefly described first below.

Merging technology: First, a merge candidate list that is referred to as a merge list for short needs to be constructed based on an MV of an adjacent block of a to-be-encoded block. An encoder selects an optimal candidate MV as an MV of a current block from the merge list according to a preset rule, where each candidate MV in each merge list has a corresponding index value; and then encodes an index value of the optimal candidate MV, to generate encoding information. The encoder may further send the encoding information to a decoder. Correspondingly, the decoder constructs a merge candidate list in a manner the same as that used by the encoder. The decoder further parses a candidate index value in the encoding information, determines an MV that corresponds to the index value and that is in the merge candidate list, and uses the determined MV as the MV of the to-be-encoded block. The merge candidate list is specifically constructed based on MVs of spatially adjacent blocks and MVs of adjacent blocks in time domain. In addition, a prediction unit described subsequently is the adjacent block. In addition, after the to-be-encoded block herein is encoded completely, the block may be referred to as a to-be-decoded unit when being decoded by the decoder.

As shown in FIG. 4, spatially adjacent blocks around a to-be-encoded block C include an adjacent block A1, an adjacent block B1, an adjacent block B0, an adjacent block A0, and an adjacent block B2. MVs of these spatially adjacent blocks may all be used as candidate MVs in the merge candidate list.

As shown in FIG. 5, a block D at a corresponding position in an adjacent encoded image is determined for the to-be-encoded block, and then, an MV obtained by stretching an MV of a block H at a position opposite to a lower right corner of the block D is added to the merge list, as an MV of the block H in the merge list. When the block H is unavailable, the block H may be replaced by a block C3 in a smaller unit in the block H. Herein, the block H may be considered as an adjacent block in time domain of a currently encoded block. A principle of scaling an MV of the adjacent block is shown in FIG. 6. Cur_pic, Col_pic, Col_ref, and Cur_ref are successively an image in which the to-be-encoded block is located, an image in which the adjacent block in time domain is located, a reference image of the image in which the adjacent block in time domain is located, and a reference image of the image in which the to-be-encoded block is located. tb represents a time difference between Cur_pic and Cur_ref, and td represents a time difference between Col_pic and Col_ref. Cur_blk indicates a position of the to-be-encoded block, and Col_blk indicates a position of the adjacent block in time domain. If a scaled MV is set to curMV and the MV of the adjacent block is set to colMV, the following relationship exists: curMV=(tb/td)*colMV.

Usually, several candidates are selected, according to a corresponding rule, from the MVs of the spatially adjacent blocks and the MVs (scaled) of the adjacent blocks in time domain, to form a merge list. If a length of the merge list does not meet a requirement, (0, 0) may be filled.

Advanced motion vector prediction technology: MVs of adjacent blocks (including a spatially adjacent block and an adjacent block in time domain, refer to corresponding descriptions in the merging technology) of a to-be-encoded block are used to construct a motion vector predictor candidate list of MVs that is referred to as a predictor list for short. An encoder selects an optimal candidate MV from the predictor list, as a predictor of an MV of the to-be-encoded block, where each MV in the predictor list has a corresponding index value; and then encodes an index value of the selected optimal candidate MV, and encodes a difference between the MV of the to-be-encoded block and the predictor, to obtain encoding information. The difference between the MV of the to-be-encoded block and the predictor is a motion vector difference (MVD). The encoder may send the encoding information to a decoder. The decoder establishes a predictor candidate list in a same manner. The decoder parses the index value and the MVD in the encoding information, and then adds the MVD to the MV corresponding to the index value obtained through parsing, to obtain a vector as the MV of the to-be-encoded block.

The predictor candidate list usually includes the MV of the spatially adjacent block and the MV of the adjacent block in time domain. For the spatially adjacent block, when a reference image of the spatially adjacent block is different from a reference image of the to-be-encoded block, an operation of scaling the MV of the spatially adjacent block at a corresponding ratio needs to be performed, and then the MV is used as a candidate in the predictor list. For a block in time domain, a manner in which an MV of the block is used as a candidate in the predictor list is the same as that in the merging technology.

Usually, several candidates are selected, according to a corresponding rule, from the MV (possibly scaled) of the spatially adjacent block and the MV (scaled) of the adjacent block in time domain, to form a predictor list. If a length of the predictor list does not meet a requirement, (0, 0) may be filled.

Layout Information:

A face formed by mapping a spherical panorama image to a surface of a polyhedron may be referred to as a face image. When the face image in the polyhedron is expanded into a two-dimensional planar image in a polyhedron format, the two-dimensional planar image may have many optional layout manners. A layout manner may be described by using layout information. There is different layout information for different layout manners. Herein, the layout information may include the following information:

(1) face quantity information of the polyhedron in a process of mapping a spherical surface to the surface of the polyhedron;

(2) face image arrangement manner information when the surface of the polyhedron is expanded into a two-dimensional image;

(3) face image arrangement order information when the surface of the polyhedron is expanded into the two-dimensional image; and (4) face image rotation information when the surface of the polyhedron is expanded into the two-dimensional image.

For example, a spherical panorama image may be mapped to surfaces of different polyhedrons, for example, a surface of a hexahedron, a surface of an octahedron, or a surface of another polyhedron. A specific polyhedron to be mapped to may be reflected by the face quantity information. After a polyhedron is determined based on the face quantity information, when a surface of the polyhedron is expanded into a two-dimensional planar image, there are a plurality of arrangement manners for the two-dimensional planar image. Using a hexahedron as an example, as shown in FIG. 3, a part n shows face images in a 4×3 form, a part r and a part s show face images in a 3×2 form, and a part t and a part u show face images in a 6×1 form. Other types are not exemplified one by one. The arrangement manner information herein is used to indicate a used arrangement manner. In addition, there may be a difference between arrangement orders of faces even in a same arrangement manner. As shown in FIG. 3, arrangement orders in the part t and the part u are different. The arrangement order information may reflect the arrangement order of the faces. In addition, a rotation operation or the like may be further performed on each face. For example, a Front face of the part t in FIG. 3 is rotated by an angle relative to a Front face of the part u. The rotation information can reflect a rotation status of each face. The layout information may further include other information. A layout manner of each face image in the two-dimensional planar image can be obtained from the layout information. It may be understood that, when the layout information and the layout manner of each face in the two-dimensional planar image are learned of, a connection relationship between the faces in the two-dimensional planar image in the polyhedron can be reversely deduced. In the embodiments of the present application, in the descriptions, front refers to front (or a front face), rear refers to back (or a rear face), right refers to right, left refers to left, top refers to upper (or the top), and bottom refers to lower (or the bottom).

In one embodiment, it may be considered that the two-dimensional planar image obtained through splicing is a target image. A coordinate system may be established for the target image to describe a relative positional relationship between points (including pixels) in the target image based on the coordinate system. An image shown in FIG. 7 is a target image. There is an origin of coordinates in an upper left corner of the target image, a horizontal direction is set to an x-axis direction, and a longitudinal direction is set to a y-axis direction. Herein, a position of the origin of coordinates is respectively offset by 0.5 pixel pitch in reverse directions along an x-axis and a y-axis for positions of pixels in the upper left corner of the image. Assuming that the target image has a width of 4t and a height of 3t, a range of a top face image is x∈(0, t), and y∈(0, t), and a range of a bottom face image is x∈(0, t), and y∈(2t, 3t). Similarly, a range of another face image can be obtained. If coordinates (x1, y1) of a pixel P are known, a face image to which P belongs can be determined, and a range of the face image can be learned of. Herein, to determine a face image in which a block is located, the face image in which the current block is located is determined by using a position of a point (for example, a central point T, another point is also feasible) in the block. For example, if it is known that the current block is located in the bottom face image, it may be learned that a range of the face image in which the current block is located is x∈(0, t), and y∈(2t, 3t).

In one embodiment, if a block is an adjacent block of the to-be-encoded block based on the M-hedron, but a position of the block in the target image is not adjacent to the to-be-encoded block, when an MV of the adjacent block is calculated, related information to be used may need to be converted. For example, in the target image, if a face image in which the adjacent block is located is rotated by 90 degrees counterclockwise, the block is adjacent to the to-be-encoded block. If coordinates of a position of the adjacent block in the target image are $(x_{s2}, y_{s2})$ before conversion, and coordinates of a position of a reference block of the adjacent block in the target image are $(x_{s1}, y_{s1})$, a calculated motion vector MVt of the adjacent block before the conversion is shown in a formula 1-1, and a calculated motion vector MVt' of the adjacent block after the conversion is shown in a formula 1-2, where MVt' is an actual motion vector MV of the adjacent block. FIG. 8 shows the motion vector MVt before the conversion and the motion vector MVt' after the conversion. Information such as "rotate by 90 degrees counterclockwise" may be reflected by layout information when the target image is arranged:

$$MVt = (x_{s2} - x_{s1}, y_{s2} - y_{s1}) \quad 1\text{-}1$$

$$MVt' = \left(x_{s2} - x_{s1}, y_{s2} - y_{s1} + \frac{(y_{s2} - y_{s1})^2 + (x_{s2} - x_{s1})^2}{|y_{s2} - y_{s1}|}\right) \quad 1\text{-}2$$

Embodiments of the present application provide a motion vector decoding method and a decoder, to improve decoding efficiency.

According to a first aspect, an embodiment of the present application provides a motion vector decoding method. The method includes: determining a prediction motion vector of a to-be-decoded unit based on a motion vector of a prediction unit of the to-be-decoded unit; when a face image in which the to-be-decoded unit is located and at least one of a face image in which a first reference unit is located and a face image in which the prediction unit is located are not face images in a same orientation, performing a first update on the prediction motion vector, where the first update is used to determine a mapping vector that is of the prediction motion vector and that is in a plane of the face image in which the to-be-decoded unit is located, the first reference unit is determined based on the motion vector of the prediction unit and a reference image identifier of the prediction unit, the face image is a planar mapping image of a panorama image in an orientation, M face images form a closed M-hedron, a centroid of the M-hedron coincides with a centroid of an object using the panorama image as a surface, a line connecting the centroid of the M-hedron to a first position point on the face image intersects the panorama image at a second position point, the first position point is a mapping point of the second position point, and M is greater than or equal to 4; and obtaining a motion vector of the to-be-decoded unit based on the prediction motion vector obtained after the first update.

A beneficial effect of this embodiment of the present application is as follows: By performing the foregoing operations, an MV of an adjacent block determined based on a connection relationship in the M-hedron is often geometrically deformed. Therefore, when the prediction motion vector of the prediction unit herein (which is an adjacent block) is used to calculate the motion vector of the to-be-decoded unit, during use of the prediction motion vector, whether the prediction motion vector satisfies a condition for geometrical deformation is determined first. If the condition for geometrical deformation is satisfied, the first update is performed on the prediction motion vector, where the first update is used to determine the mapping vector that is of the prediction motion vector and that is in the plane of the face image in which the to-be-decoded unit is located. Then the motion vector of the to-be-decoded unit is calculated by using the prediction motion vector obtained after the first update, so that the calculated motion vector of the to-be-decoded unit is more accurate, thereby improving encoding efficiency.

In one embodiment, the prediction unit is a decoded unit determined, based on adjacency between the face images in the M-hedron, to be adjacent in space domain or time domain to the to-be-decoded unit.

In one embodiment, before the performing a first update on the prediction motion vector, where the first update is used to determine a mapping vector that is of the prediction motion vector and that is in a plane of the face image in which the to-be-decoded unit is located, the method further includes: determining, based on the prediction motion vector, a first corresponding point corresponding to a first preset point in the prediction unit, where the first corresponding point belongs to the first reference unit; and when a face image in which the first corresponding point is located and the face image in which the to-be-decoded unit is located are not face images in a same orientation, determining that the face image in which the first reference unit is located and the face image in which the to-be-decoded unit is located are not face images in a same orientation.

In one embodiment, the determining, based on the prediction motion vector, a first corresponding point corresponding to a first preset point in the prediction unit includes: determining the first corresponding point in a reference image that is determined by using the reference image identifier, where a position vector from the first corresponding point to the first preset point is determined based on the motion vector of the prediction unit.

In one embodiment, before the performing a first update on the prediction motion vector, where the first update is used to determine a mapping vector that is of the prediction motion vector and that is in a plane of the face image in which the to-be-decoded unit is located, the method further includes: when a face image in which the first preset point is located and the face image in which the to-be-decoded unit is located are not face images in a same orientation, determining that the face image in which the to-be-decoded unit is located and the face image in which the prediction unit is located are not face images in a same orientation.

In one embodiment, the performing a first update on the prediction motion vector, where the first update is used to determine a mapping vector that is of the prediction motion vector and that is in a plane of the face image in which the to-be-decoded unit is located includes: when the face image in which the to-be-decoded unit is located and the face image in which the first reference unit is located are not face images in a same orientation, and the face image in which the to-be-decoded unit is located and the face image in which the prediction unit is located are face images in a same orientation, determining, based on a position vector from the first preset point to a first update point, the prediction motion vector obtained after the first update; when the face image in which the to-be-decoded unit is located and the face image in which the prediction unit is located are not face images in a same orientation, and the face image in which the to-be-decoded unit is located and the face image in which the first reference unit is located are face images in a same orientation, determining, based on a position vector from a second update point to the first corresponding point, the prediction motion vector obtained after the first update; or when the face image in which the to-be-decoded unit is located and each of the face image in which the first reference unit is located and the face image in which the prediction unit is located are not face images in a same orientation, determining, based on a position vector from a second update point to a first update point, the prediction motion vector obtained after the first update.

In one embodiment, before the determining, based on a position vector from the first preset point to a first update point, the prediction motion vector obtained after the first update or the determining, based on a position vector from a second update point to a first update point, the prediction motion vector obtained after the first update, the method further includes: obtaining a first mapping point that is of the first corresponding point and that is on a surface of the M-hedron, where a distance from the first mapping point to a first edge of the M-hedron is equal to a distance from the first corresponding point to the first edge, and the first edge is a junction between a face image in which the first mapping point is located and a face image in a same orientation as the face image in which the to-be-decoded unit is located; and determining that an intersecting point between a line connecting the centroid of the M-hedron to the first mapping point and a plane of the face image in the same orientation as the face image in which the to-be-decoded unit is located is the first update point.

A beneficial effect of this embodiment of the present application is as follows: The motion vector of the to-be-decoded unit is calculated by using an updated vector of the first reference unit, so that the calculated motion vector of the to-be-decoded unit is more accurate, thereby improving encoding efficiency.

In one embodiment, before the determining, based on a position vector from a second update point to the first corresponding point, the prediction motion vector obtained after the first update or the determining, based on a position vector from a second update point to a first update point, the prediction motion vector obtained after the first update, the method further includes: obtaining a second mapping point that is of the first preset point and that is on the surface of the M-hedron, where a distance from the second mapping point to a second edge of the M-hedron is equal to a distance from the first preset point to the second edge, and the second edge is a junction between a face image in which the second mapping point is located and the face image in which the to-be-decoded unit is located; and determining that an intersecting point between a line connecting the centroid of the M-hedron to the second mapping point and a plane of the face image in which the to-be-decoded unit is located is the second update point.

A beneficial effect of this embodiment of the present application is as follows: The motion vector of the to-be-decoded unit is calculated by using an updated vector of the prediction unit, so that the calculated motion vector of the to-be-decoded unit is more accurate, thereby improving encoding efficiency.

In one embodiment, the obtaining a motion vector of the to-be-decoded unit based on the prediction motion vector obtained after the first update includes: using the prediction motion vector obtained after the first update, as the motion vector of the to-be-decoded unit.

In one embodiment, the obtaining a motion vector of the to-be-decoded unit based on the prediction motion vector obtained after the first update includes: using the prediction motion vector obtained after the first update, as a motion vector predictor of the to-be-decoded unit; parsing a data stream, to obtain a motion vector difference of the to-be-decoded unit, where the motion vector difference is used to represent a difference between the motion vector predictor of the to-be-decoded unit and the motion vector of the to-be-decoded unit; and obtaining the motion vector of the to-be-decoded unit based on the motion vector predictor of the to-be-decoded unit and the motion vector difference of the to-be-decoded unit.

In one embodiment, after the obtaining a motion vector of the to-be-decoded unit based on the prediction motion vector obtained after the first update, the method further includes: determining a second reference unit of the to-be-decoded unit based on the motion vector of the to-be-decoded unit; and when the face image in which the to-be-decoded unit is located and a face image in which the second reference unit is located are not face images in a same orientation, performing a second update on the motion vector of the to-be-decoded unit.

In one embodiment, before the performing a second update on the motion vector of the to-be-decoded unit, the method further includes: determining, based on the motion vector of the to-be-decoded unit, a second corresponding point corresponding to a second preset point in the to-be-decoded unit, where the second corresponding point belongs to the second reference unit; and when a face image in which the second corresponding point is located and the face image in which the to-be-decoded unit is located are not face images in a same orientation, determining that the face image in which the to-be-decoded unit is located and the face image in which the second reference unit is located are not face images in a same orientation.

In one embodiment, the performing a second update on the motion vector of the to-be-decoded unit includes: determining that an intersecting point between a line connecting the centroid of the M-hedron to the second corresponding point and the surface of the M-hedron is a first target point; obtaining a third update point that is of the first target point and that is in a plane of a face image in a same orientation as a face image in which the second preset point is located, where a distance from the third update point to a third edge of the M-hedron is equal to a distance from the first target point to the third edge, and the third edge is a junction between the face image in the same orientation as the face image in which the second preset point is located and a face image in which the first target point is located; and determining the prediction motion vector based on a position vector from the third update point to the second preset point.

A beneficial effect of this embodiment of the present application is as follows: The motion vector of the to-be-decoded unit is updated, thereby improving encoding efficiency.

In one embodiment, before the performing a first update on the prediction motion vector, where the first update is used to determine a mapping vector that is of the prediction motion vector and that is in a plane of the face image in which the to-be-decoded unit is located, the method further includes: determining that an intersecting point between a line connecting the centroid of the M-hedron to the first corresponding point and the surface of the M-hedron is a second target point; obtaining a fourth update point that is of the second target point and that is in a plane of a face image in a same orientation as the face image in which the first preset point is located, where a distance from the fourth update point to a fourth edge of the M-hedron is equal to a distance from the second target point to the fourth edge, and the fourth edge is a junction between the face image in the same orientation as the face image in which the first preset point is located and a face image in which the second target point is located; and determining the prediction motion vector based on a position vector from the fourth update point to the first preset point.

A beneficial effect of this embodiment of the present application is as follows: The motion vector of the to-be-decoded unit is calculated by using the updated vector of the prediction unit, so that the calculated motion vector of the to-be-decoded unit is more accurate, thereby improving encoding efficiency.

In one embodiment, the first preset point includes a central point of the prediction unit or a point in an upper left corner of the prediction unit.

In one embodiment, the second preset point includes a central point of the to-be-decoded unit or a point in an upper left corner of the to-be-decoded unit.

According to a second aspect, an embodiment of the present application provides a decoder. The decoder includes a processing unit, a first update unit, and a first obtaining unit, where the processing unit is configured to determine a prediction motion vector of a to-be-decoded unit based on a motion vector of a prediction unit of the to-be-decoded unit; the first update unit is configured to: when a face image in which the to-be-decoded unit is located and at least one of a face image in which a first reference unit is located and a face image in which the prediction unit is located are not face images in a same orientation, perform a first update on the prediction motion vector, where the first update is used to determine a mapping vector that is of the prediction motion vector and that is in a plane of the face image in which the to-be-decoded unit is located, the first reference unit is determined based on the motion vector of the prediction unit and a reference image identifier of the prediction unit, the face image is a planar mapping image of a panorama image in an orientation, M face images form a closed M-hedron, a centroid of the M-hedron coincides with a centroid of an object using the panorama image as a surface, a line connecting the centroid of the M-hedron to a first position point on the face image intersects the panorama image at a second position point, the first position point is a mapping point of the second position point, and M is greater than or equal to 4; and the first obtaining unit is configured to obtain a motion vector of the to-be-decoded unit based on the prediction motion vector obtained after the first update.

By running the foregoing units, an MV of an adjacent block determined based on a connection relationship in the M-hedron is often geometrically deformed. Therefore, when the prediction motion vector of the prediction unit herein (which is an adjacent block) is used to calculate the motion vector of the to-be-decoded unit, during use of the prediction motion vector, whether the prediction motion vector satisfies a condition for geometrical deformation is determined first. If the condition for geometrical deformation is satisfied, the first update is performed on the prediction motion vector, where the first update is used to determine the mapping vector that is of the prediction motion vector and that is in the plane of the face image in which the to-be-decoded unit is located. Then the motion vector of the to-be-decoded unit is calculated by using the prediction motion vector obtained after the first update, so that the calculated motion vector of the to-be-decoded unit is more accurate, thereby improving encoding efficiency.

In one embodiment, the prediction unit is a decoded unit determined, based on adjacency between the face images in the M-hedron, to be adjacent in space domain or time domain to the to-be-decoded unit.

In one embodiment, the decoder further includes: a first determining unit, configured to: before the first update is performed on the prediction motion vector, where the first update is used to determine the mapping vector that is of the prediction motion vector and that is in the plane of the face image in which the to-be-decoded unit is located, determine, based on the prediction motion vector, a first corresponding point corresponding to a first preset point in the prediction unit, where the first corresponding point belongs to the first reference unit; and a second determining unit, configured to: when a face image in which the first corresponding point is located and the face image in which the to-be-decoded unit is located are not face images in a same orientation, determine that the face image in which the first reference unit is located and the face image in which the to-be-decoded unit is located are not face images in a same orientation.

In one embodiment, the first determining unit is configured to determine the first corresponding point in a reference image that is determined by using the reference image identifier, where a position vector from the first corresponding point to the first preset point is determined based on the motion vector of the prediction unit.

In one embodiment, the decoder further includes: a third determining unit, configured to: when a face image in which the first preset point is located and the face image in which the to-be-decoded unit is located are not face images in a same orientation, determine that the face image in which the to-be-decoded unit is located and the face image in which the prediction unit is located are not face images in a same orientation.

In one embodiment, the first update unit is configured to: when the face image in which the to-be-decoded unit is located and the face image in which the first reference unit is located are not face images in a same orientation, and the face image in which the to-be-decoded unit is located and the face image in which the prediction unit is located are face images in a same orientation, determine, based on a position vector from the first preset point to a first update point, the prediction motion vector obtained after the first update; when the face image in which the to-be-decoded unit is located and the face image in which the prediction unit is located are not face images in a same orientation, and the face image in which the to-be-decoded unit is located and the face image in which the first reference unit is located are face images in a same orientation, determine, based on a position vector from a second update point to the first corresponding point, the prediction motion vector obtained after the first update; or when the face image in which the to-be-decoded unit is located and each of the face image in which the first reference unit is located and the face image in which the prediction unit is located are not face images in a same orientation, determine, based on a position vector from a second update point to a first update point, the prediction motion vector obtained after the first update.

In one embodiment, the decoder further includes: a second obtaining unit, configured to: before the prediction motion vector obtained after the first update is determined based on the position vector from the first preset point to the first update point, or the prediction motion vector obtained after the first update is determined based on the position vector from the second update point to the first update point, obtain a first mapping point that is of the first corresponding point and that is on a surface of the M-hedron, where a distance from the first mapping point to a first edge of the M-hedron is equal to a distance from the first corresponding point to the first edge, and the first edge is a junction between a face image in which the first mapping point is located and a face image in a same orientation as the face image in which the to-be-decoded unit is located; and a fourth determining unit, configured to determine that an intersecting point between a line connecting the centroid of the M-hedron to the first mapping point and a plane of the face image in the same orientation as the face image in which the to-be-decoded unit is located is the first update point.

In one embodiment, the decoder further includes: a third obtaining unit, configured to: before the prediction motion vector obtained after the first update is determined based on the position vector from the second update point to the first corresponding point, or the prediction motion vector obtained after the first update is determined based on the position vector from the second update point to the first update point, obtain a second mapping point that is of the first preset point and that is on the surface of the M-hedron, where a distance from the second mapping point to a second edge of the M-hedron is equal to a distance from the first preset point to the second edge, and the second edge is a junction between a face image in which the second mapping point is located and the face image in which the to-be-decoded unit is located; and a fifth determining unit, configured to determine that an intersecting point between a line connecting the centroid of the M-hedron to the second mapping point and a plane of the face image in which the to-be-decoded unit is located is the second update point.

In one embodiment, the first obtaining unit is configured to use the prediction motion vector obtained after the first update, as the motion vector of the to-be-decoded unit.

In one embodiment, the first obtaining unit is configured to: use the prediction motion vector obtained after the first update, as a motion vector predictor of the to-be-decoded unit; parse a data stream, to obtain a motion vector difference of the to-be-decoded unit, where the motion vector difference is used to represent a difference between the motion vector predictor of the to-be-decoded unit and the motion vector of the to-be-decoded unit; and obtain the motion vector of the to-be-decoded unit based on the motion vector predictor of the to-be-decoded unit and the motion vector difference of the to-be-decoded unit.

In one embodiment, the decoder further includes: a sixth determining unit, configured to: after the motion vector of the to-be-decoded unit is obtained based on the prediction motion vector obtained after the first update, determine a second reference unit of the to-be-decoded unit based on the motion vector of the to-be-decoded unit; and a second update unit, configured to: when the face image in which the to-be-decoded unit is located and a face image in which the second reference unit is located are not face images in a same orientation, perform a second update on the motion vector of the to-be-decoded unit.

In one embodiment, the decoder further includes: a seventh determining unit, configured to: before the second update is performed on the motion vector of the to-be-decoded unit, determine, based on the motion vector of the to-be-decoded unit, a second corresponding point corresponding to a second preset point in the to-be-decoded unit, where the second corresponding point belongs to the second reference unit; and an eighth determining unit, configured to: when a face image in which the second corresponding point is located and the face image in which the to-be-decoded unit is located are not face images in a same orientation, determine that the face image in which the to-be-decoded unit is located and the face image in which the second reference unit is located are not face images in a same orientation.

In one embodiment, the second update unit is configured to: determine that an intersecting point between a line connecting the centroid of the M-hedron to the second corresponding point and the surface of the M-hedron is a first target point; obtain a third update point that is of the first target point and that is in a plane of a face image in a same orientation as a face image in which the second preset point is located, where a distance from the third update point to a third edge of the M-hedron is equal to a distance from the first target point to the third edge, and the third edge is a junction between the face image in the same orientation as the face image in which the second preset point is located and a face image in which the first target point is located; and determine the prediction motion vector based on a position vector from the third update point to the second preset point.

In one embodiment, the decoder further includes: a ninth determining unit, configured to: before the first update is performed on the prediction motion vector, where the first update is used to determine the mapping vector that is of the prediction motion vector and that is in the plane of the face image in which the to-be-decoded unit is located, determine that an intersecting point between a line connecting the centroid of the M-hedron to the first corresponding point and the surface of the M-hedron is a second target point; a fourth obtaining unit, configured to obtain a fourth update point that is of the second target point and that is in a plane of a face image in a same orientation as the face image in which the first preset point is located, where a distance from the fourth update point to a fourth edge of the M-hedron is equal to a distance from the second target point to the fourth edge, and the fourth edge is a junction between the face image in the same orientation as the face image in which the first preset point is located and a face image in which the second target point is located; and a tenth determining unit, configured to determine the prediction motion vector based on a position vector from the fourth update point to the first preset point.

In one embodiment, the first preset point includes a central point of the prediction unit or a point in an upper left corner of the prediction unit.

In one embodiment, the second preset point includes a central point of the to-be-decoded unit or a point in an upper left corner of the to-be-decoded unit.

According to a third aspect, an embodiment of the present application provides another decoder. The decoder includes a processor and a memory. The memory is configured to store a program and data. The processor invokes the program in the memory, to perform the following operations: determining a prediction motion vector of a to-be-decoded unit based on a motion vector of a prediction unit of the to-be-decoded unit; when a face image in which the to-be-decoded unit is located and at least one of a face image in which a first reference unit is located and a face image in which the prediction unit is located are not face images in a same orientation, performing a first update on the prediction motion vector, where the first update is used to determine a mapping vector that is of the prediction motion vector and that is in a plane of the face image in which the to-be-decoded unit is located, the first reference unit is determined based on the motion vector of the prediction unit and a reference image identifier of the prediction unit, the face image is a planar mapping image of a panorama image in an orientation, M face images form a closed M-hedron, a centroid of the M-hedron coincides with a centroid of an object using the panorama image as a surface, a line connecting the centroid of the M-hedron to a first position point on the face image intersects the panorama image at a second position point, the first position point is a mapping point of the second position point, and M is greater than or equal to 4; and obtaining a motion vector of the to-be-decoded unit based on the prediction motion vector obtained after the first update.

By performing the foregoing operations, an MV of an adjacent block determined based on a connection relationship in the M-hedron is often geometrically deformed. Therefore, when the prediction motion vector of the prediction unit herein (which is an adjacent block) is used to calculate the motion vector of the to-be-decoded unit, during use of the prediction motion vector, whether the prediction motion vector satisfies a condition for geometrical deformation is determined first. If the condition for geometrical deformation is satisfied, the first update is performed on the prediction motion vector, where the first update is used to determine the mapping vector that is of the prediction motion vector and that is in the plane of the face image in which the to-be-decoded unit is located. Then the motion vector of the to-be-decoded unit is calculated by using the prediction motion vector obtained after the first update, so that the calculated motion vector of the to-be-decoded unit is more accurate, thereby improving encoding efficiency.

In one embodiment, the prediction unit is a decoded unit determined, based on adjacency between the face images in the M-hedron, to be adjacent in space domain or time domain to the to-be-decoded unit.

In one embodiment, before performing the first update on the prediction motion vector, where the first update is used to determine the mapping vector that is of the prediction motion vector and that is in the plane of the face image in which the to-be-decoded unit is located, the processor is further configured to: determine, based on the prediction motion vector, a first corresponding point corresponding to a first preset point in the prediction unit, where the first corresponding point belongs to the first reference unit; and when a face image in which the first corresponding point is located and the face image in which the to-be-decoded unit is located are not face images in a same orientation, determine that the face image in which the first reference unit is located and the face image in which the to-be-decoded unit is located are not face images in a same orientation.

In one embodiment, the determining, by the processor based on the prediction motion vector, a first corresponding point corresponding to a first preset point in the prediction unit is: determining the first corresponding point in a reference image that is determined by using the reference image identifier, where a position vector from the first corresponding point to the first preset point is determined based on the motion vector of the prediction unit.

In one embodiment, before performing the first update on the prediction motion vector, where the first update is used to determine the mapping vector that is of the prediction motion vector and that is in the plane of the face image in which the to-be-decoded unit is located, the processor is further configured to: when a face image in which the first preset point is located and the face image in which the to-be-decoded unit is located are not face images in a same orientation, determine that the face image in which the to-be-decoded unit is located and the face image in which the prediction unit is located are not face images in a same orientation.

In one embodiment, the performing, by the processor, a first update on the prediction motion vector, where the first update is used to determine a mapping vector that is of the prediction motion vector and that is in a plane of the face image in which the to-be-decoded unit is located is:

when the face image in which the to-be-decoded unit is located and the face image in which the first reference unit is located are not face images in a same orientation, and the face image in which the to-be-decoded unit is located and the face image in which the prediction unit is located are face images in a same orientation, determining, based on a position vector from the first preset point to a first update point, the prediction motion vector obtained after the first update; when the face image in which the to-be-decoded unit is located and the face image in which the prediction unit is located are not face images in a same orientation, and the face image in which the to-be-decoded unit is located and the face image in which the first reference unit is located are face images in a same orientation, determining, based on a position vector from a second update point to the first corresponding point, the prediction motion vector obtained after the first update; or when the face image in which the to-be-decoded unit is located and each of the face image in which the first reference unit is located and the face image in which the prediction unit is located are not face images in a same orientation, determining, based on a position vector from a second update point to a first update point, the prediction motion vector obtained after the first update.

In one embodiment, before determining, based on the position vector from the first preset point to the first update point, the prediction motion vector obtained after the first update, or determining, based on the position vector from the second update point to the first update point, the prediction motion vector obtained after the first update, the processor is further configured to: obtain a first mapping point that is of the first corresponding point and that is on a surface of the M-hedron, where a distance from the first mapping point to a first edge of the M-hedron is equal to a distance from the first corresponding point to the first edge, and the first edge is a junction between a face image in which the first mapping point is located and a face image in a same orientation as the face image in which the to-be-decoded unit is located; and determine that an intersecting point between a line connecting the centroid of the M-hedron to the first mapping point and a plane of the face image in the same orientation as the face image in which the to-be-decoded unit is located is the first update point.

In one embodiment, before determining, based on the position vector from the second update point to the first corresponding point, the prediction motion vector obtained after the first update or determining, based on the position vector from the second update point to the first update point, the prediction motion vector obtained after the first update, the processor is further configured to: obtain a second mapping point that is of the first preset point and that is on the surface of the M-hedron, where a distance from the second mapping point to a second edge of the M-hedron is equal to a distance from the first preset point to the second edge, and the second edge is a junction between a face image in which the second mapping point is located and the face image in which the to-be-decoded unit is located; and determine that an intersecting point between a line connecting the centroid of the M-hedron to the second mapping point and a plane of the face image in which the to-be-decoded unit is located is the second update point.

In one embodiment, the obtaining, by the processor, a motion vector of the to-be-decoded unit based on the prediction motion vector obtained after the first update is: using the prediction motion vector obtained after the first update, as the motion vector of the to-be-decoded unit.

In one embodiment, the obtaining, by the processor, a motion vector of the to-be-decoded unit based on the prediction motion vector obtained after the first update is: using the prediction motion vector obtained after the first update, as a motion vector predictor of the to-be-decoded unit; parsing a data stream, to obtain a motion vector difference of the to-be-decoded unit, where the motion vector difference is used to represent a difference between the motion vector predictor of the to-be-decoded unit and the motion vector of the to-be-decoded unit; and obtaining the motion vector of the to-be-decoded unit based on the motion vector predictor of the to-be-decoded unit and the motion vector difference of the to-be-decoded unit.

In one embodiment, after obtaining the motion vector of the to-be-decoded unit based on the prediction motion vector obtained after the first update, the processor is further configured to: determine a second reference unit of the to-be-decoded unit based on the motion vector of the to-be-decoded unit; and when the face image in which the to-be-decoded unit is located and a face image in which the second reference unit is located are not face images in a same orientation, perform a second update on the motion vector of the to-be-decoded unit.

In one embodiment, before the performing a second update on the motion vector of the to-be-decoded unit, the operations further include: determining, based on the motion vector of the to-be-decoded unit, a second corresponding point corresponding to a second preset point in the to-be-decoded unit, where the second corresponding point belongs to the second reference unit; and when a face image in which the second corresponding point is located and the face image in which the to-be-decoded unit is located are not face images in a same orientation, determining that the face image in which the to-be-decoded unit is located and the face image in which the second reference unit is located are not face images in a same orientation.

In one embodiment, the performing, by the processor, a second update on the motion vector of the to-be-decoded unit is: determining that an intersecting point between a line connecting the centroid of the M-hedron to the second corresponding point and the surface of the M-hedron is a first target point; obtaining a third update point that is of the first target point and that is in a plane of a face image in a same orientation as a face image in which the second preset point is located, where a distance from the third update point to a third edge of the M-hedron is equal to a distance from the first target point to the third edge, and the third edge is a junction between the face image in the same orientation as the face image in which the second preset point is located and a face image in which the first target point is located; and determining the prediction motion vector based on a position vector from the third update point to the second preset point.

In one embodiment, before performing the first update on the prediction motion vector, where the first update is used to determine the mapping vector that is of the prediction motion vector and that is in the plane of the face image in which the to-be-decoded unit is located, the processor is further configured to: determine that an intersecting point between a line connecting the centroid of the M-hedron to the first corresponding point and the surface of the M-hedron is a second target point; obtain a fourth update point that is of the second target point and that is in a plane of a face image in a same orientation as the face image in which the first preset point is located, where a distance from the fourth update point to a fourth edge of the M-hedron is equal to a distance from the second target point to the fourth edge, and the fourth edge is a junction between the face image in the same orientation as the face image in which the first preset point is located and a face image in which the second target point is located; and determine the prediction motion vector based on a position vector from the fourth update point to the first preset point.

In one embodiment, the first preset point includes a central point of the prediction unit or a point in an upper left corner of the prediction unit.

In one embodiment, the second preset point includes a central point of the to-be-decoded unit or a point in an upper left corner of the to-be-decoded unit.

By implementing this embodiment of the present application, an MV of an adjacent block determined based on a connection relationship in the M-hedron is often geometrically deformed. Therefore, when the prediction motion vector of the prediction unit herein (which is an adjacent block) is used to calculate the motion vector of the to-be-decoded unit, during use of the prediction motion vector, whether the prediction motion vector satisfies a condition for geometrical deformation is determined first. If the condition for geometrical deformation is satisfied, the first update is performed on the prediction motion vector, where the first update is used to determine the mapping vector that is of the prediction motion vector and that is in the plane of the face image in which the to-be-decoded unit is located. Then the motion vector of the to-be-decoded unit is calculated by using the prediction motion vector obtained after the first update, so that the calculated motion vector of the to-be-decoded unit is more accurate, thereby improving encoding efficiency. It should be understood that, the technical solutions according to the second and third aspects in the embodiments of the present application are the same as those according to the first aspect, and their beneficial effects are similar. Details are not described again.

DESCRIPTION OF EMBODIMENTS

The following describes the embodiments of the present application with reference to the accompanying drawings in the embodiments of the present application.

A decoder described in the embodiments of the present application may be a module, a device, or an apparatus having an image encoding function or an image decoding function, for example, a mobile phone, a television, a tablet computer, a notebook computer, a palmtop computer, a mobile Internet device (MID), or a wearable device (for example, a smartwatch (such as iWatch), a smart band, or a pedometer).

Figure 9:
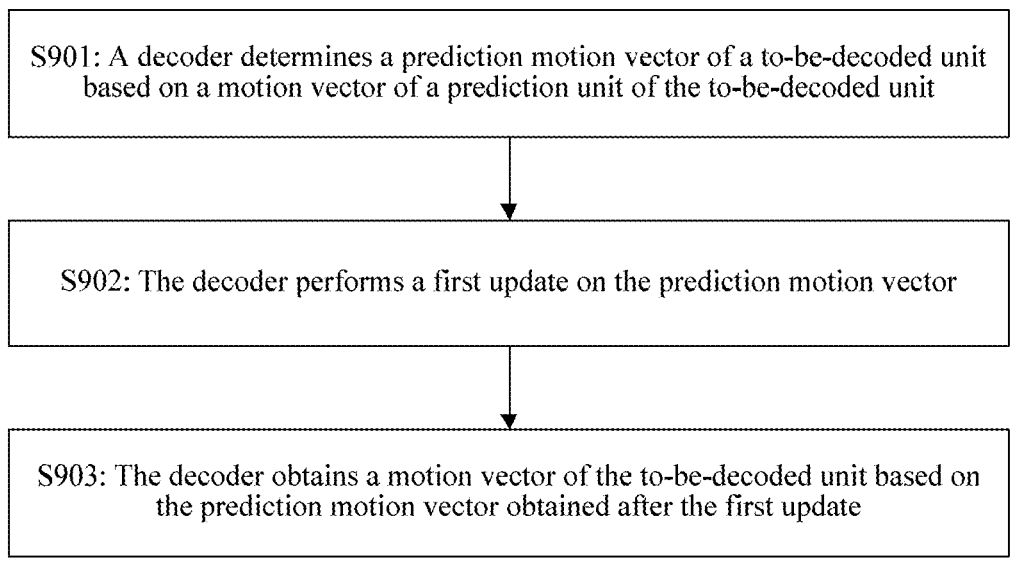
FIG. 9 is a schematic flowchart of a motion vector decoding method according to an embodiment of the present application.

FIG. 9 is a schematic flowchart of a motion vector decoding method according to an embodiment of the present application. The method includes, but is not limited to, the following operations.

Operation S901: A decoder determines a prediction motion vector of a to-be-decoded unit based on a motion vector of a prediction unit of the to-be-decoded unit.

Specifically, the to-be-decoded unit is a currently decoded unit (or referred to as a block). The prediction unit belongs to an adjacent block of the to-be-decoded unit. The adjacent block may be a decoded unit determined, based on adjacency between face images in an M-hedron, to be adjacent in space domain or time domain to the to-be-decoded unit. Herein, there may be a plurality of adjacent blocks. In the plurality of adjacent blocks, there may be adjacent decoded units in time domain, or there may be adjacent decoded units in space domain. Herein, a concept of a "unit" refers to a block in an image. For ease of understanding, the M-hedron is described below.

M face images form a closed M-hedron, and each face image is a planar mapping image in an orientation in a panorama image, so that the M face images may be considered as face images in M different orientations obtained by mapping the panorama image in the M orientations, where M is greater than or equal to 4. A centroid of the M-hedron coincides with a centroid of an object using the panorama image as a surface. A line connecting the centroid of the M-hedron to a first position point on the face image intersects the panorama image at a second position point. The first position point is a mapping point of the second position point. The panorama image is generally referred to as a VR image, or the like. Because these images are not two-dimensional planar images, the image is referred to as a panorama image. Preferably, the panorama image herein is a spherical panorama image. When the panorama image is a spherical panorama image, the center of gravity is a center of sphere of the spherical panorama image.

An example in which the curved face image is a spherical panorama image is used to more specifically describe several optional manners of mapping the spherical panorama image to the M-hedron.

Manner 1: Pixels are planned in each face of the M-hedron, to enable the pixels in each face to form an array (the pixels forming the array may be referred to as integer pixels). Then a line connects each pixel in each face to a center of sphere of the panorama image to intersect at the panorama image. An intersecting point between a line segment of the connection line and the panorama image is often not an integer pixel in the panorama image. If the intersecting point is not an integer pixel, a pixel value of an integer pixel around the intersecting point is processed through interpolation, to calculate a pixel value of the intersecting point. Subsequently, the pixel value of the intersecting point is used as a pixel value of a pixel in the line segment in the M-hedron. Each face having a pixel of the M-hedron is a face image.

Manner 2: A ray is casted from a center of sphere of the panorama image as a starting point to each integer pixel in the panorama image, to intersect at the M-hedron. If an intersecting point between the ray and the M-hedron, the center of sphere, and a pixel in the panorama image are on one line, a pixel value of the pixel is used as a pixel value of the intersecting point. Further, pixels are planned in each face of the M-hedron to enable the pixels in each face to form an array. If a pixel in the M-hedron coincides with an intersecting point on the M-hedron, a pixel value of the intersecting point is used as a pixel value of the pixel. If the pixel does not coincide with an intersecting point on the M-hedron, an intersecting point around the pixel is processed through interpolation to calculate a pixel value of the pixel. Each face having a pixel of the M-hedron is a face image.

Figure 1:
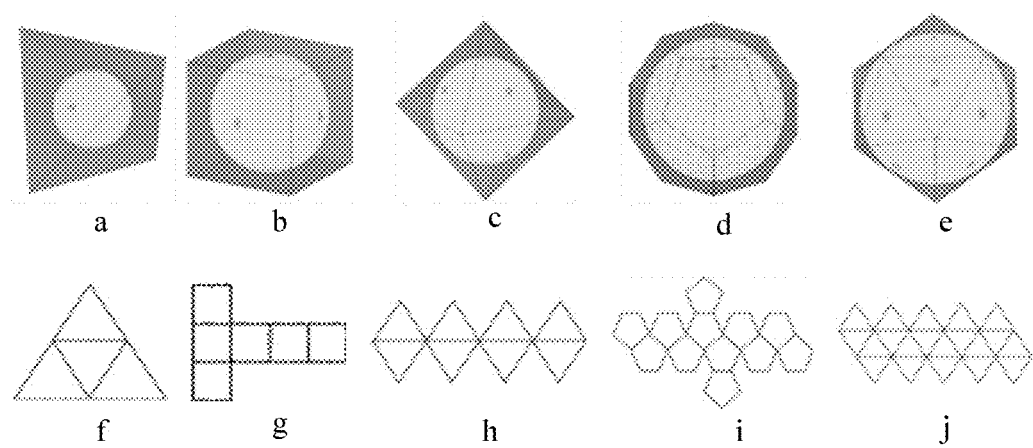
FIG. 1 is a schematic structural diagram of a polyhedron according to an embodiment of the present application.
Figure 2:
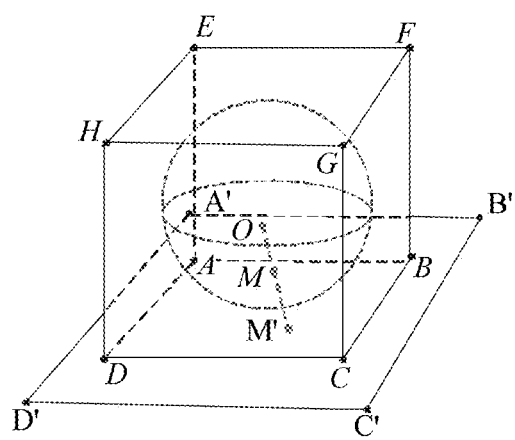
FIG. 2 is a schematic structural diagram of another hexahedron according to an embodiment of the present application.
Figure 3:
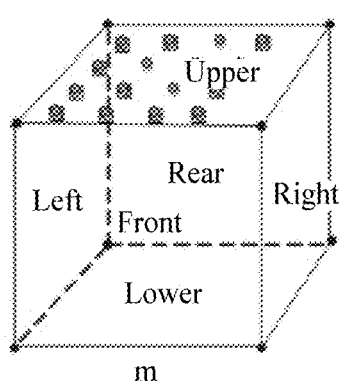
FIG. 3 is a schematic diagram of a correspondence between a two-dimensional plane and a hexahedron according to an embodiment of the present application.
Figure 3:
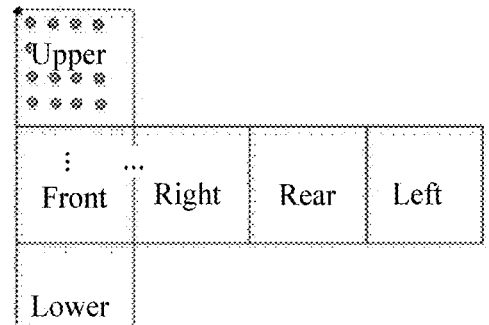
Figure 3:
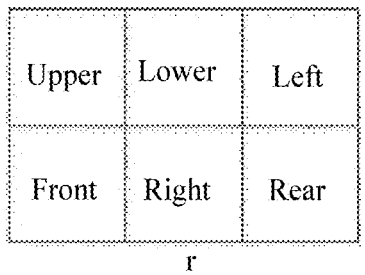
Figure 3:
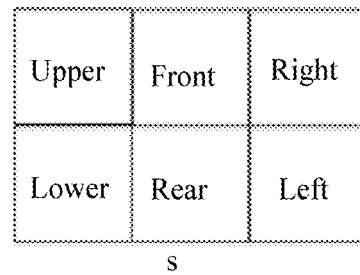
Figure 3:
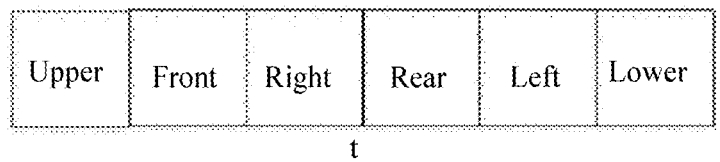
Figure 3:
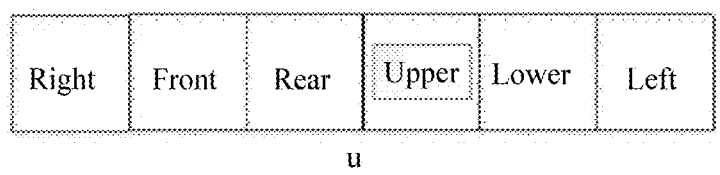
Figure 4:
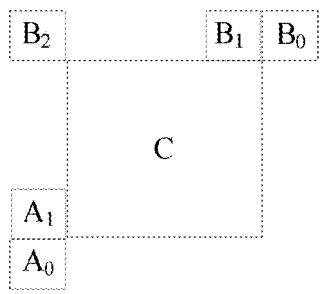
FIG. 4 is a schematic scenario diagram of adjacent blocks according to an embodiment of the present application.
Figure 5:
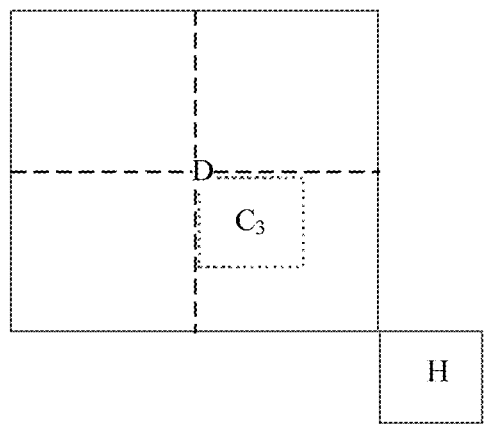
FIG. 5 is another schematic scenario diagram of adjacent blocks according to an embodiment of the present application.
Figure 6:
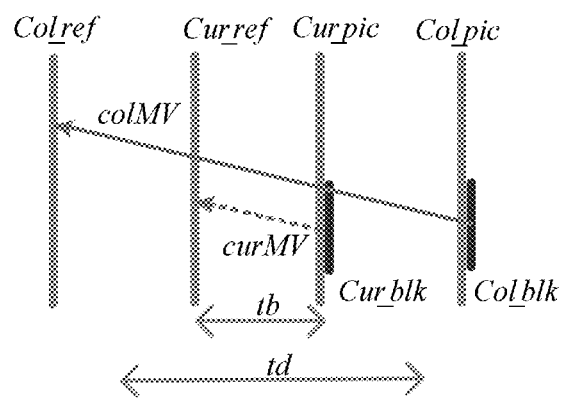
FIG. 6 is another schematic scenario diagram of adjacent blocks according to an embodiment of the present application.
Figure 7:
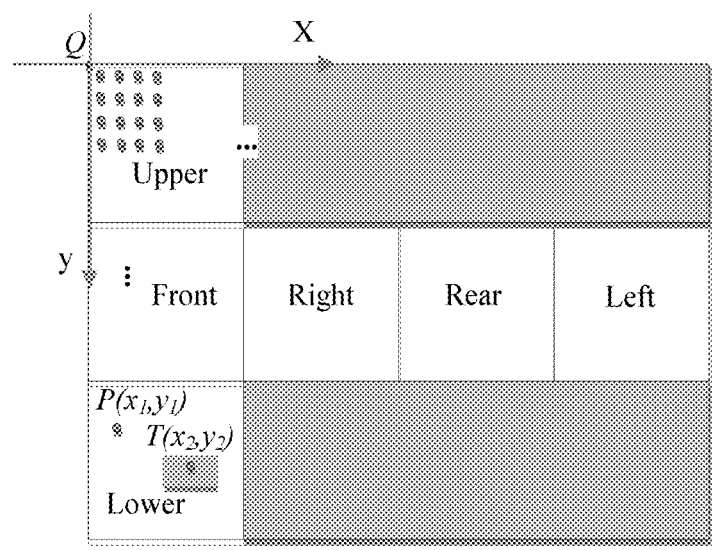
FIG. 7 is a schematic scenario diagram of a target image according to an embodiment of the present application.
Figure 8:
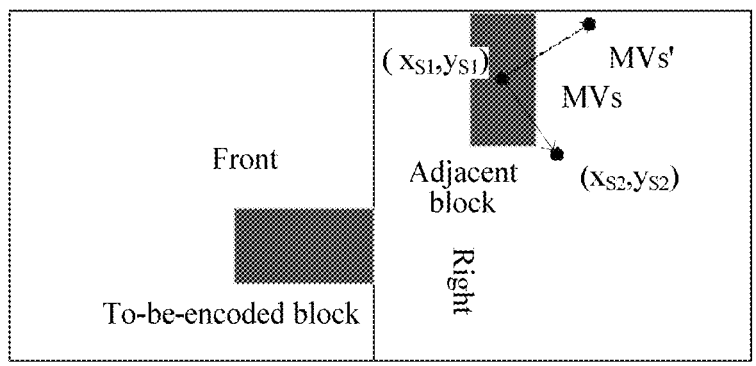
FIG. 8 is a schematic scenario diagram of motion vector conversion according to an embodiment of the present application.

For example, if two face images of the M-hedron intersect at one edge, the two face images are adjacent. In one embodiment, when an adjacent block of a block is described in the M-hedron, a face image adjacent to a face image in which the block is located is folded into a same plane as the face image in which the block is located. Then, an adjacent block of the block is determined in the same plane by referring to a positional relationship when an adjacent block is determined in the prior art. For example, in the M-hedron, if a block C0 and a block A3 are respectively located in different face images, the block C0 and the block A3 each have a boundary on an edge of the M-hedron, and a vertex of one angle of the block C0 coincides with a vertex of one angle of the block A3 on the edge, the block A3 may be an adjacent block of the block C0 (A3 herein may be analogized to A1 in FIG. 4, and C0 herein may be analogized to C in FIG. 4). For another example, in the M-hedron, if a block C1 and a block A4 are respectively located in different face images, a vertex of one angle of the block C1 coincides with a vertex of one angle of the block A4 on one edge of the M-hedron, and a border of the block C1 does not coincide with a border of the block A4 in the M-hedron, the block A4 may be an adjacent block of the block C1 (the block A4 herein is equivalent to blocks A0, B2, and B0 in FIG. 4, and the block C1 herein is equivalent to a block C in FIG. 4). It may be understood that, when an adjacent block in time domain of a to-be-encoded unit is determined, the adjacent block in time domain also exists in an M-hedron, and a specification of the M-hedron is the same as a specification (for example, information such as a side length of the M-hedron) of an M-hedron in which a to-be-encoded image is located. For features of the adjacent block in time domain and an adjacent block in space domain, further refer to related descriptions in the Summary.

Face images in a same orientation in any two M-hedrons may be referred to as face images in a same orientation. Specifically, there are a plurality of spherical panorama images in a panoramic video (or referred to as a VR video). Each panorama image is mapped to one M-hedron according to the principle described above. Assuming that each of two panorama images is mapped to a hexahedron (an M-hedron has M orientations), and face images in six orientations of the hexahedron are respectively referred to as a front face image, a bottom face image, a top face image, a rear face image, a right face image, and a left face image, a bottom face image of one of the two M-hedrons and a bottom face image of the other M-hedron are face images in a same orientation, a left face image of one of the two M-hedrons and a left face image of the other M-hedron are face images in a same orientation, and the rest may be deduced by analogy.

It should be noted that, currently, most of objects processed in image processing are two-dimensional planar images. Therefore, the M face images of the M-hedron herein may be spliced into a two-dimensional planar image to adapt to processing on a two-dimensional planar image. In this way, a face image, a block, a unit, and the like that are described in this embodiment of the present application have two states: These face images, blocks, units, and the like are in one state in the M-hedron, and are in the other state in the two-dimensional planar image. When a block in the two-dimensional planar image is processed, it is inevitable to use adjacency, a positional relationship, and the like of the block in a corresponding M-hedron. Therefore, layout information can be established. The layout information may record adjacency, positional relationships, and the like of the face image, the block, the unit, and the like in the M-hedron, or record adjacency, positional relationships, and the like of the face image, the block, the unit, and the like in the two-dimensional planar image. A position of each face image in the M-hedron may be identified by the layout information (which may also be understood as that adjacency of each face image in the M-hedron is identified). In one embodiment, a position that is of a block in a face image in the two-dimensional planar image and that is in the M-hedron may be identified by the layout information (which may also be understood as that adjacency of each block in the M-hedron is identified).

In one embodiment, the decoder may perform related calculation based on motion vectors of prediction units in these adjacent blocks. The prediction unit may be a block or some blocks determined in these adjacent blocks based on a pre-given filtering condition. For example, on an encoding side, one block may be selected from these adjacent blocks according to a particular rule, and an MV of the block is used to calculate the motion vector of the to-be-decoded unit. The selected block is the prediction unit. On the encoding side, an identifier may be encoded to indicate that the selected block is the prediction unit. Correspondingly, the decoder can determine the prediction unit based on the identifier.

Operation S902: The decoder performs a first update on the prediction motion vector.

Specifically, when a face image in which the to-be-decoded unit is located and at least one of a face image in which a first reference unit is located and a face image in which the prediction unit is located are not face images in a same orientation, the first update is performed on the prediction motion vector. The first reference unit is determined based on the motion vector of the prediction unit and a reference image identifier of the prediction unit. The reference image identifier herein defines a reference image in which the first reference unit is located. For example, after the prediction unit is offset based on the motion vector of the prediction unit, a relative position of the prediction unit in the image in which the prediction unit is located is the same as a relative position of the first reference unit in the reference image. It may be learned from the foregoing condition that there are at least the following three solutions for the first update according to some embodiments.

Solution 1: When the face image in which the first reference unit is located and the face image in which the to-be-decoded unit is located are not face images in a same orientation, and the face image in which the to-be-decoded unit is located and the face image in which the prediction unit is located are face images in a same orientation, the first update is performed on the prediction motion vector. In this solution, before the performing a first update on the prediction motion vector, where the first update is used to determine a mapping vector that is of the prediction motion vector and that is in a plane of the face image in which the to-be-decoded unit is located, the method further includes: determining, based on the prediction motion vector, a first corresponding point corresponding to a first preset point in the prediction unit, where for example, a position vector from the first corresponding point to the first preset point is determined based on the motion vector of the prediction unit, and the first corresponding point is a point in the first reference unit; and when the first corresponding point does not belong to a face image in a same orientation as the face image in which the to-be-decoded unit is located, determining that the face image in which the first reference unit is located and the face image in which the to-be-decoded unit is located are not face images in a same orientation. A process of performing the first update is as follows:

First, a first mapping point that is of the first corresponding point and that is on a surface of the M-hedron is obtained, where a distance from the first mapping point to a first edge of the M-hedron is equal to a distance from the first corresponding point to the first edge, and the first edge is a junction between a face image in which the first mapping point is located and a face image in a same orientation as the face image in which the to-be-decoded unit is located. Preferably, a distance from any point on the first edge to the first mapping point is equal to a distance from the point to the first corresponding point. Then, it is determined that an intersecting point between a line connecting the centroid of the M-hedron to the first mapping point and a plane of the face image in the same orientation as the face image in which the to-be-decoded unit is located is a first update point. For example, the prediction motion vector obtained after the first update is equal to a coordinate offset from coordinates of the first preset point to coordinates of the first update point. Preferably, the first update is performed on the premise that a position, in a target image, of the face image in the same orientation as the face image to which the to-be-decoded unit belongs completely coincides with a position on the M-hedron, but such an application scenario may not exist actually. Herein, the scenario is constructed to clearly describe the foregoing geometric relationship. In addition, if the first reference unit and the to-be-decoded unit are not in a same M-hedron, when the foregoing geometric relationship is described, it may be considered that the M-hedron in which the first reference unit is located (namely, an M-hedron to which the first corresponding point belongs) coincides with an M-hedron in which the to-be-decoded unit is located, so that various geometric relationships between the first reference unit (or the first corresponding point) and the to-be-decoded unit can be conveniently described.

Solution 2: When the face image in which the prediction unit is located and the face image in which the to-be-decoded unit is located are not face images in a same orientation, and the face image in which the to-be-decoded unit is located and the face image in which the first reference unit is located are face images in a same orientation, the first update is performed on the prediction motion vector. Therefore, before the first update is performed, it is determined that the face image in which the to-be-decoded unit is located and the face image in which the prediction unit is located are not face images in a same orientation. For example, whether the first preset point belongs to the face image in which the to-be-decoded unit is located is determined. If the first preset point does not belong to the face image in which the to-be-decoded unit is located, it may be determined that the face image in which the to-be-decoded unit is located and the face image in which the prediction unit is located are not face images in a same orientation. A process of performing the first update is as follows:

First, a second mapping point that is of the first preset point and that is on the surface of the M-hedron is obtained, where a distance from the second mapping point to a second edge of the M-hedron is equal to a distance from the first preset point to the second edge, and the second edge is a junction between a face image in which the second mapping point is located and the face image in which the to-be-decoded unit is located. Then, it is determined that an intersecting point between a line connecting the centroid of the M-hedron to the second mapping point and a plane of the face image in which the to-be-decoded unit is located is a second update point. For example, the prediction motion vector obtained after the first update is equal to a coordinate offset from coordinates of the second update point to coordinates of the first corresponding point. Preferably, the first update is performed on the premise that a position, in the target image, of the face image to which the to-be-decoded unit belongs completely coincides with a position on the M-hedron, but such an application scenario may not exist actually. Herein, the scenario is constructed to clearly describe the foregoing geometric relationship. In addition, if the prediction unit and the to-be-decoded unit are not in a same M-hedron, when the foregoing geometric relationship is described, it may be considered that the M-hedron in which the prediction unit is located (namely, an M-hedron in which the first preset point is located) coincides with the M-hedron in which the to-be-decoded unit is located, so that various geometric relationships between the first reference unit (or the first corresponding point) and the to-be-decoded unit can be conveniently described.

Solution 3: When the face image in which the to-be-decoded unit is located and each of the face image in which the first reference unit is located and the face image in which the prediction unit is located are not face images in a same orientation, the first update is performed on the prediction motion vector. Therefore, before the first update is performed, whether the face image in which the first reference unit is located and the face image in which the to-be-decoded unit is located are face images in a same orientation is determined, and whether the face image in which the prediction unit is located and the face image in which the to-be-decoded unit is located are face images in a same orientation is determined. If the face image in which the to-be-decoded unit is located and each of the face image in which the first reference unit is located and the face image in which the prediction unit is located are not face images in a same orientation, the first update is performed on the prediction motion vector. During the first update, the first update point may be determined based on a manner in Solution 1, and the second update point may be determined based on a manner in Solution 2. Then the prediction motion vector obtained after the first update is determined based on a position vector from a second update point to a first update point. For example, the prediction motion vector obtained after the first update is equal to a coordinate offset from coordinates of the second update point to coordinates of the first update point.

Figure 10:
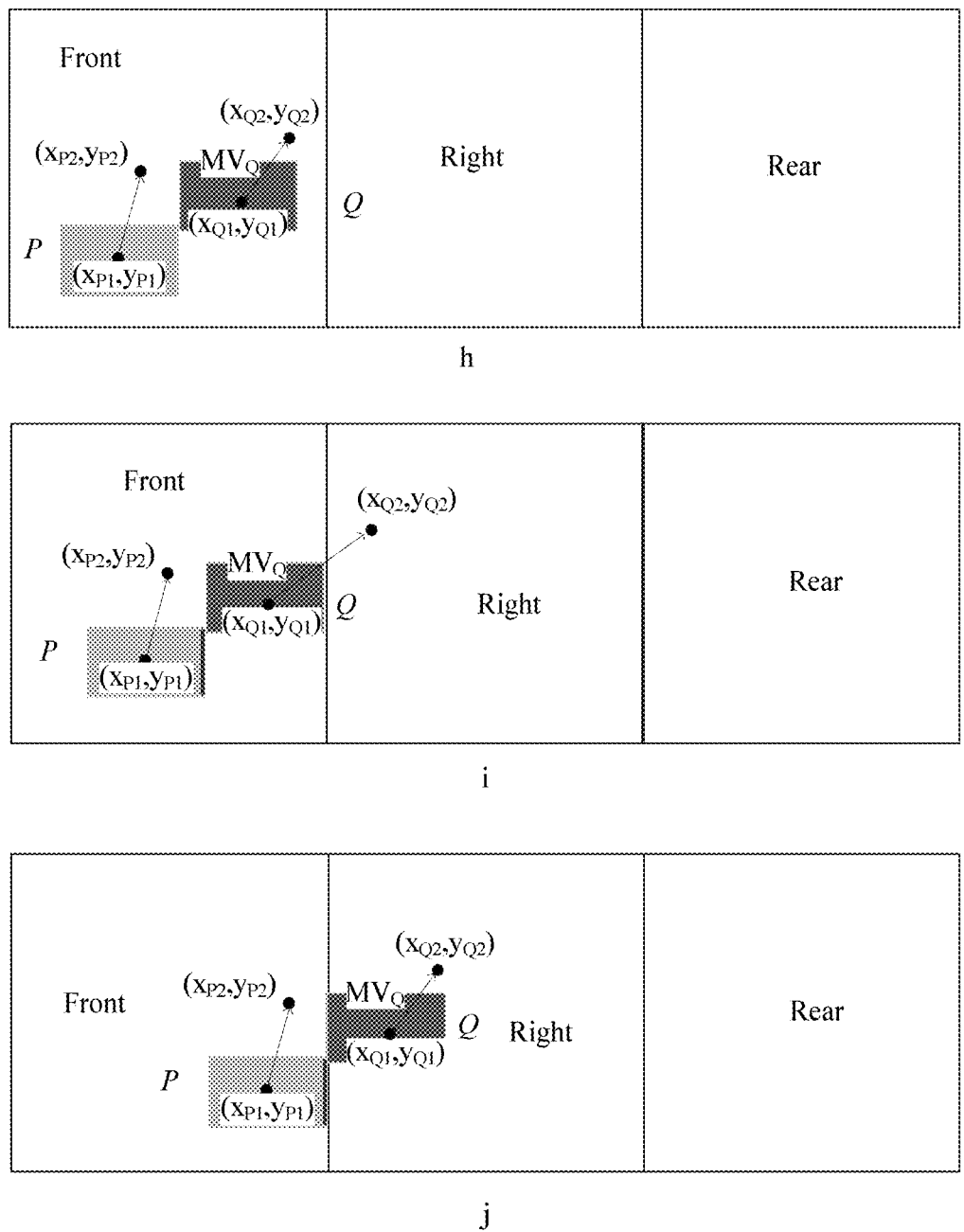
FIG. 10 is a schematic scenario diagram of a motion vector according to an embodiment of the present application.

The following describes related scenarios of the foregoing three solutions by using an example in FIG. 10. FIG. 10 includes a to-be-decoded unit P, a prediction unit Q of the to-be-decoded unit P, a second preset point $(x_{P1}, y_{P1})$, a second corresponding point $(x_{P2}, y_{P2})$, a first preset point $(x_{Q1}, y_{Q1})$, and a first corresponding point $(x_{Q2}, y_{Q2})$. The second preset point is a preconfigured point used to represent a position of the to-be-decoded unit. Preferably, the second preset point may be a central point of the prediction unit or a point in an upper left corner of the prediction unit. The first preset point is a preconfigured point used to present a position of the prediction unit Q. Preferably, the first preset point may be a central point of the prediction unit or a point in an upper left corner of the prediction unit. A vector $(x_{Q2}-x_{Q1}, y_{Q2}-y_{Q1})$ from the first preset point to the first corresponding point is equal to the prediction motion vector. A vector $(x_{P2}-x_{P1}, y_{P2}-y_{P1})$ from the second preset point to the second corresponding point is the motion vector of the to-be-decoded unit to be subsequently calculated. In FIG. 10, a part h indicates that both the first preset point and the first corresponding point are in the front face image, and the to-be-decoded unit P is also in the front face image, so that the face image in which the to-be-decoded unit is located and each of the face image in which the first reference unit is located and the face image in which the prediction unit is located are face images in a same orientation; a part i indicates that the first preset point is in the front face image, the first corresponding point is not in the front face image, and the to-be-decoded unit P is in the front face image, so that the face image in which the prediction unit is located and the face image in which the to-be-decoded unit is located are face images in a same orientation, and the face image in which the first reference unit is located and the face image in which the to-be-decoded unit is located are not face images in a same orientation; a part j indicates that the first preset point is not in the front face image, the first corresponding point is not in the front face image, and the to-be-decoded unit P is in the front face image, so that the face image in which the prediction unit is located and the face image in which the to-be-decoded unit is located are not face images in a same orientation, and the face image in which the first reference unit is located and the face image in which the to-be-decoded unit is located are not face images in a same orientation.

Figure 11:
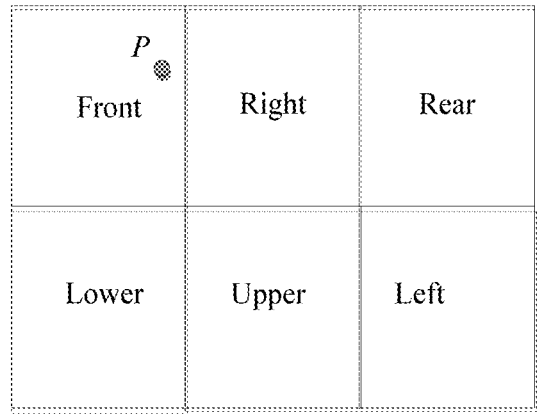
FIG. 11 is a schematic scenario diagram of an M-hedron according to an embodiment of the present application.
Figure 11:
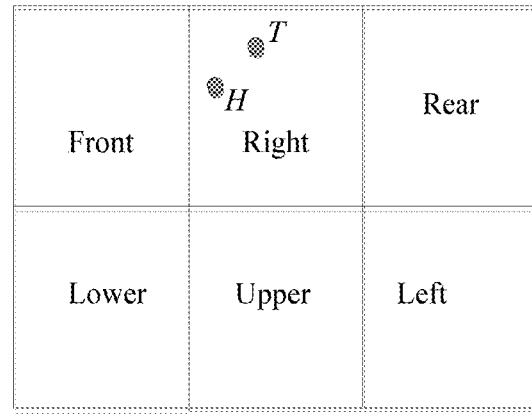
Figure 11:
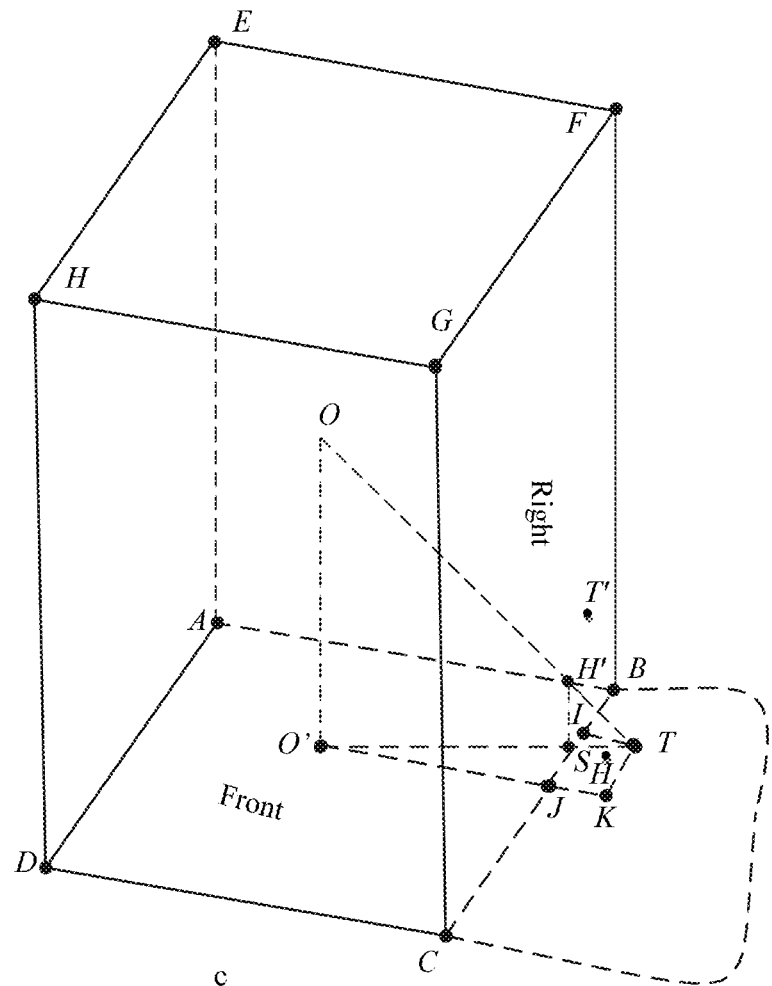

FIG. 11 shows a manner of determining the first update point based on the first corresponding point. In FIG. 11, a part a shows a position of the to-be-decoded unit P in a two-dimensional plane obtained through splicing by expanding the M-hedron (several vertexes of the M-hedron are A, B, C, D, E, F, G, and H); a part b shows a position of a first corresponding point H and a first update point T in the target image; a point that corresponds to the first corresponding point H and that is in the M-hedron is a first mapping point H'; a point that corresponds to the first update point and that is in the M-hedron is T'; and a part c shows a manner of correcting the first corresponding point into a plane of a face image in a same orientation as the face image in which the to-be-decoded unit is located, where O is a centroid of the polyhedron, and is also a circle center of the spherical panorama image, O' is a center of the front face image. In the part c, when a length $L_{SJ}$ of SJ and a length $L_{SH'}$ of SH' are known quantities, a length $L_{KT}$ of KT and a length $L_{JK}$ of JK can be very easily determined. To be specific, after the position of the first mapping point H' in the polyhedron is determined, the position of the first update point T can be determined. Assuming that a side length of a regular hexahedron in FIG. 11 is t, $L_{KT}$ and $L_{JK}$ can be calculated by using a formula 2-1 and a formula 2-2:

$$L_{JK} = \frac{\frac{t}{2} * L_{SH'}}{\frac{t}{2} - L_{SH'}} \quad \text{formula 2-1}$$

$$L_{KT} = \frac{\frac{t}{2} * L_{SJ}}{\frac{t}{2} - L_{SH'}} \quad \text{formula 2-2}$$

Figure 12:
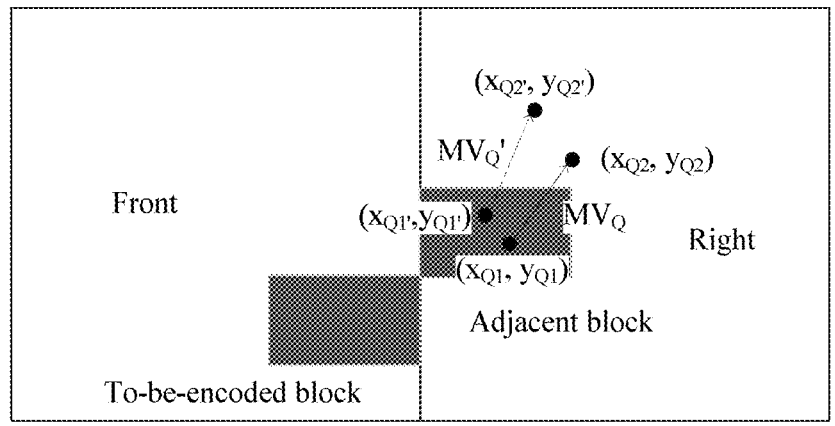
FIG. 12 is another schematic scenario diagram of motion vector conversion according to an embodiment of the present application.

A principle of determining the second update point based on the first preset point is the same as a principle of determining the first update point based on the first corresponding point. In the part j in FIG. 10, the second update point obtained based on the first preset point $(x_{Q1}, y_{Q1})$ is $(x_{Q1'}, y_{Q1'})$, and the first update point obtained based on the first corresponding point $(x_{Q2}, y_{Q2})$ is $(x_{Q2'}, y_{Q2'})$. Therefore, a vector from the second update point to the first update point is $(x_{Q2'}-x_{Q1'}, y_{Q2'}-y_{Q1'})$, to be specific, the prediction motion vector obtained after the first update is equal to $MV_Q'=(x_{Q2'}-x_{Q1'}, y_{Q2'}-y_{Q1'})$. The foregoing Solution 3 is described herein, and Solution 1 and Solution 2 have a same principle as Solution 3, and details are not described herein again. FIG. 12 is a schematic diagram of comparison between the prediction motion vector $(x_{Q2}-x_{Q1}, y_{Q2}-y_{Q1})$ before the first update and the prediction motion vector $(x_{Q2'}-y_{Q1'}, y_{Q2'}-y_{Q1'})$ obtained after the first update.

Operation S903: The decoder obtains a motion vector of the to-be-decoded unit based on the prediction motion vector obtained after the first update.

Specifically, a specific manner of determining the motion vector of the to-be-decoded unit may vary with a used encoding technology (regardless of which manner is used, encoding technologies used by the decoder and an encoder are the same), and a merging technology and an advanced motion vector prediction technology are separately used as an example for description below.

Merging technology: The obtaining, by the decoder, a motion vector of the to-be-decoded unit based on the prediction motion vector obtained after the first update may be: using the prediction motion vector obtained after the first update, as the motion vector of the to-be-decoded unit, or may be: using a motion vector obtained by scaling the prediction motion vector obtained after the first update, as the motion vector of the to-be-decoded unit. For a scaling manner, refer to related descriptions related to scaling in the Summary.

Advanced motion vector prediction technology: The obtaining a motion vector of the to-be-decoded unit based on the prediction motion vector obtained after the first update includes: using the prediction motion vector obtained after the first update as a motion vector predictor (MVP) of the to-be-decoded unit; or using a motion vector obtained by scaling the prediction motion vector obtained after the first update, as a motion vector predictor of the to-be-decoded unit, where for a scaling manner, refer to related descriptions related to scaling in the Summary; parsing a data stream to obtain a motion vector difference MVD of the to-be-decoded unit; and obtaining the motion vector of the to-be-decoded unit based on the motion vector predictor MVP of the to-be-decoded unit and the motion vector difference MVD of the to-be-decoded unit. Preferably, a sum of the motion vector predictor MVP and the motion vector difference MVD of the to-be-decoded unit is used as the motion vector of the to-be-decoded unit, to be specific, the MV of the to-be-decoded unit is equal to MVP+MVD.

In one embodiment, after the obtaining, by the decoder, a motion vector of the to-be-decoded unit based on the prediction motion vector obtained after the first update, the method further includes: determining a second reference unit of the to-be-decoded unit based on the motion vector of the to-be-decoded unit; and when the face image in which the to-be-decoded unit is located and a face image in which the second reference unit is located are not face images in a same orientation, performing a second update on the motion vector of the to-be-decoded unit. Therefore, before the second update is performed, whether the face image in which the to-be-decoded unit is located and the face image in which the second reference unit is located are face images in a same orientation further needs to be determined. A specific manner may be as follows: A second corresponding point corresponding to a second preset point in the to-be-decoded unit is determined based on the motion vector of the to-be-decoded unit. For example, a coordinate offset from coordinates of the second preset point to coordinates of the second corresponding point is equal to the motion vector of the to-be-decoded unit, and the second corresponding point is a point in the second reference unit. When a face image in which the second corresponding point is located and the face image in which the to-be-decoded unit is located are not face images in a same orientation, it is determined that the face image in which the to-be-decoded unit is located and the face image in which the second reference unit is located are not face images in a same orientation. Further, the performing a second update on the motion vector of the to-be-decoded unit may be: determining that an intersecting point between a line connecting the centroid of the M-hedron to the second corresponding point and the surface of the M-hedron is a first target point; obtaining a third update point that is of the first target point and that is in a plane of a face image in a same orientation as a face image in which the second preset point is located, where a distance from the third update point to a third edge of the M-hedron is equal to a distance from the first target point to the third edge, and the third edge is a junction between the face image in the same orientation as the face image in which the second preset point is located and a face image in which the first target point is located, where preferably, a distance from any point on the third edge to the third mapping point is equal to a distance from the point to the second corresponding point; and then determining, based on a position vector from the second preset point to the third update point, a motion vector of the to-be-decoded unit obtained after the second update. For example, the motion vector of the to-be-decoded unit obtained after the second update is equal to a coordinate offset from the coordinates of the second preset point to coordinates of the third update point. Preferably, the second update is performed on the premise that the position, in the target image, of the face image to which the to-be-decoded unit belongs completely coincides with a position on the M-hedron, but such an application scenario may not exist actually. Herein, the scenario is constructed to clearly describe the foregoing geometric relationship.

In another embodiment, even if positions of two face images in the target image are adjacent in the M-hedron, a process of mapping the panorama image to the M-hedron and a subsequent related process cause geometrical deformation of content at a junction between the two face images, and a person skilled in the art is trying to overcome the geometrical deformation by using a related technology. Consequently, an MV of the block is not an actual MV. Therefore, before the MV of the prediction unit is used, the MV of the prediction unit needs to be restored. A restoration process is as follows according to some embodiments:

It is determined that an intersecting point between a line connecting the centroid of the M-hedron to the first corresponding point and the surface of the M-hedron is a second target point. A fourth update point that is of the second target point and that is in a plane of a face image in a same orientation as the face image in which the first preset point is located is obtained, where a distance from the fourth update point to a fourth edge of the M-hedron is equal to a distance from the second target point to the fourth edge, the fourth edge is a junction between the face image in the same orientation as the face image in which the first preset point is located and a face image in which the second target point is located, and preferably, a distance from any point on the fourth edge to the fourth update point is equal to a distance from the point to the target point. Further, the prediction motion vector is determined based on a position vector from the fourth update point to the first preset point. For example, a vector from the first preset point to the fourth update point is equal to the prediction motion vector. In one embodiment, the prediction motion vector is generated on the premise that a position, in the target image, of the face image to which the prediction unit belongs completely coincides with a position on the M-hedron, but such an application scenario may not exist actually. Herein, the scenario is constructed to clearly describe the foregoing geometric relationship.

In the method described in FIG. 9, an MV of an adjacent block determined based on a connection relationship in the M-hedron is often geometrically deformed. Therefore, when the prediction motion vector of the prediction unit herein (which is an adjacent block) is used to calculate the motion vector of the to-be-decoded unit, during use of the prediction motion vector, whether the prediction motion vector satisfies a condition for geometrical deformation is determined first. If the condition for geometrical deformation is satisfied, the first update is performed on the prediction motion vector, where the first update is used to determine the mapping vector that is of the prediction motion vector and that is in the plane of the face image in which the to-be-decoded unit is located. Then the motion vector of the to-be-decoded unit is calculated by using the prediction motion vector obtained after the first update, so that the calculated motion vector of the to-be-decoded unit is more accurate, thereby improving encoding efficiency.

The method in the embodiments of the present application is described in detail above. For ease of better implementation of the foregoing solutions in the embodiments of the present application, correspondingly, apparatuses in embodiments of the present application are provided below.

Figure 13:
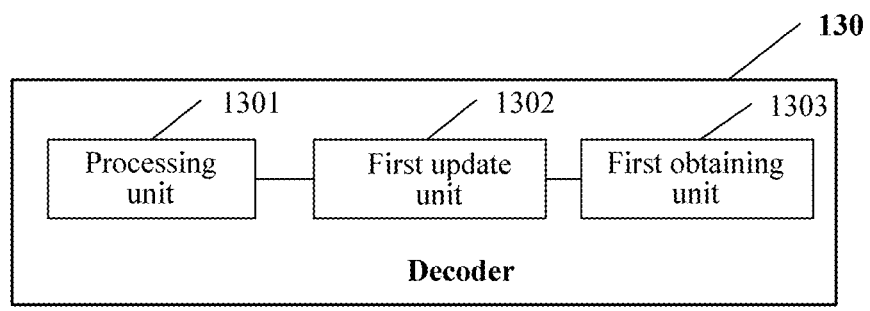
FIG. 13 is a schematic structural diagram of a decoder according to an embodiment of the present application.

FIG. 13 is a schematic structural diagram of a decoder 130 according to an embodiment of the present application. The decoder 130 may include a processing unit 1301, a first update unit 1302, and a first obtaining unit 1303. Each unit is described in detail below.

The processing unit 1301 is configured to determine a prediction motion vector of a to-be-decoded unit based on a motion vector of a prediction unit of the to-be-decoded unit. The first update unit 1302 is configured to: when a face image in which the to-be-decoded unit is located and at least one of a face image in which a first reference unit is located and a face image in which the prediction unit is located are not face images in a same orientation, perform a first update on the prediction motion vector, where the first update is used to determine a mapping vector that is of the prediction motion vector and that is in a plane of the face image in which the to-be-decoded unit is located, the first reference unit is determined based on the motion vector of the prediction unit and a reference image identifier of the prediction unit, the face image is a planar mapping image of a panorama image in an orientation, M face images form a closed M-hedron, a centroid of the M-hedron coincides with a centroid of an object using the panorama image as a surface, a line connecting the centroid of the M-hedron to a first position point on the face image intersects the panorama image at a second position point, the first position point is a mapping point of the second position point, and M is greater than or equal to 4. The first obtaining unit 1303 is configured to obtain a motion vector of the to-be-decoded unit based on the prediction motion vector obtained after the first update.

By running the foregoing units, an MV of an adjacent block determined based on a connection relationship in the M-hedron is often geometrically deformed. Therefore, when the prediction motion vector of the prediction unit herein (which is an adjacent block) is used to calculate the motion vector of the to-be-decoded unit, during use of the prediction motion vector, whether the prediction motion vector satisfies a condition for geometrical deformation is determined first. If the condition for geometrical deformation is satisfied, the first update is performed on the prediction motion vector, where the first update is used to determine the mapping vector that is of the prediction motion vector and that is in the plane of the face image in which the to-be-decoded unit is located. Then the motion vector of the to-be-decoded unit is calculated by using the prediction motion vector obtained after the first update, so that the calculated motion vector of the to-be-decoded unit is more accurate, thereby improving encoding efficiency.

In one embodiment, the prediction unit is a decoded unit determined, based on adjacency between the face images in the M-hedron, to be adjacent in space domain or time domain to the to-be-decoded unit.

In another embodiment, the decoder further includes: a first determining unit, configured to: before the first update is performed on the prediction motion vector, where the first update is used to determine the mapping vector that is of the prediction motion vector and that is in the plane of the face image in which the to-be-decoded unit is located, determine, based on the prediction motion vector, a first corresponding point corresponding to a first preset point in the prediction unit, where the first corresponding point belongs to the first reference unit; and a second determining unit, configured to: when a face image in which the first corresponding point is located and the face image in which the to-be-decoded unit is located are not face images in a same orientation, determine that the face image in which the first reference unit is located and the face image in which the to-be-decoded unit is located are not face images in a same orientation.

In another embodiment, the first determining unit is configured to determine the first corresponding point in a reference image that is determined by using the reference image identifier, where a position vector from the first corresponding point to the first preset point is determined based on the motion vector of the prediction unit.

In another embodiment, the decoder further includes: a third determining unit, configured to: when a face image in which the first preset point is located and the face image in which the to-be-decoded unit is located are not face images in a same orientation, determine that the face image in which the to-be-decoded unit is located and the face image in which the prediction unit is located are not face images in a same orientation.

In another embodiment, the first update unit is configured to:

when the face image in which the to-be-decoded unit is located and the face image in which the first reference unit is located are not face images in a same orientation, and the face image in which the to-be-decoded unit is located and the face image in which the prediction unit is located are face images in a same orientation, determine, based on a position vector from the first preset point to a first update point, the prediction motion vector obtained after the first update;

when the face image in which the to-be-decoded unit is located and the face image in which the prediction unit is located are not face images in a same orientation, and the face image in which the to-be-decoded unit is located and the face image in which the first reference unit is located are face images in a same orientation, determine, based on a position vector from a second update point to the first corresponding point, the prediction motion vector obtained after the first update; or when the face image in which the to-be-decoded unit is located and each of the face image in which the first reference unit is located and the face image in which the prediction unit is located are not face images in a same orientation, determine, based on a position vector from a second update point to a first update point, the prediction motion vector obtained after the first update.

In another embodiment, the decoder further includes: a second obtaining unit, configured to: before the prediction motion vector obtained after the first update is determined based on the position vector from the first preset point to the first update point, or the prediction motion vector obtained after the first update is determined based on the position vector from the second update point to the first update point, obtain a first mapping point that is of the first corresponding point and that is on a surface of the M-hedron, where a distance from the first mapping point to a first edge of the M-hedron is equal to a distance from the first corresponding point to the first edge, and the first edge is a junction between a face image in which the first mapping point is located and a face image in a same orientation as the face image in which the to-be-decoded unit is located; and a fourth determining unit, configured to determine that an intersecting point between a line connecting the centroid of the M-hedron to the first mapping point and a plane of the face image in the same orientation as the face image in which the to-be-decoded unit is located is the first update point.

In another embodiment, the decoder further includes: a third obtaining unit, configured to: before the prediction motion vector obtained after the first update is determined based on the position vector from the second update point to the first corresponding point, or the prediction motion vector obtained after the first update is determined based on the position vector from the second update point to the first update point, obtain a second mapping point that is of the first preset point and that is on the surface of the M-hedron, where a distance from the second mapping point to a second edge of the M-hedron is equal to a distance from the first preset point to the second edge, and the second edge is a junction between a face image in which the second mapping point is located and the face image in which the to-be-decoded unit is located; and a fifth determining unit, configured to determine that an intersecting point between a line connecting the centroid of the M-hedron to the second mapping point and a plane of the face image in which the to-be-decoded unit is located is the second update point.

In another embodiment, the first obtaining unit is configured to use the prediction motion vector obtained after the first update, as the motion vector of the to-be-decoded unit.

In another embodiment, the first obtaining unit is configured to: use the prediction motion vector obtained after the first update, as a motion vector predictor of the to-be-decoded unit; parse a data stream, to obtain a motion vector difference of the to-be-decoded unit, where the motion vector difference is used to represent a difference between the motion vector predictor of the to-be-decoded unit and the motion vector of the to-be-decoded unit; and obtain the motion vector of the to-be-decoded unit based on the motion vector predictor of the to-be-decoded unit and the motion vector difference of the to-be-decoded unit.

In another embodiment, the decoder further includes: a sixth determining unit, configured to: after the motion vector of the to-be-decoded unit is obtained based on the prediction motion vector obtained after the first update, determine a second reference unit of the to-be-decoded unit based on the motion vector of the to-be-decoded unit; and a second update unit, configured to: when the face image in which the to-be-decoded unit is located and a face image in which the second reference unit is located are not face images in a same orientation, perform a second update on the motion vector of the to-be-decoded unit.

In another embodiment, the decoder further includes: a seventh determining unit, configured to: before the second update is performed on the motion vector of the to-be-decoded unit, determine, based on the motion vector of the to-be-decoded unit, a second corresponding point corresponding to a second preset point in the to-be-decoded unit, where the second corresponding point belongs to the second reference unit; and an eighth determining unit, configured to: when a face image in which the second corresponding point is located and the face image in which the to-be-decoded unit is located are not face images in a same orientation, determine that the face image in which the to-be-decoded unit is located and the face image in which the second reference unit is located are not face images in a same orientation.

In another embodiment, the second update unit is configured to: determine that an intersecting point between a line connecting the centroid of the M-hedron to the second corresponding point and the surface of the M-hedron is a first target point; obtain a third update point that is of the first target point and that is in a plane of a face image in a same orientation as a face image in which the second preset point is located, where a distance from the third update point to a third edge of the M-hedron is equal to a distance from the first target point to the third edge, and the third edge is a junction between the face image in the same orientation as the face image in which the second preset point is located and a face image in which the first target point is located; and determine the prediction motion vector based on a position vector from the third update point to the second preset point.

In another embodiment, the decoder further includes: a ninth determining unit, configured to: before the first update is performed on the prediction motion vector, where the first update is used to determine the mapping vector that is of the prediction motion vector and that is in the plane of the face image in which the to-be-decoded unit is located, determine that an intersecting point between a line connecting the centroid of the M-hedron to the first corresponding point and the surface of the M-hedron is a second target point; a fourth obtaining unit, configured to obtain a fourth update point that is of the second target point and that is in a plane of a face image in a same orientation as the face image in which the first preset point is located, where a distance from the fourth update point to a fourth edge of the M-hedron is equal to a distance from the second target point to the fourth edge, and the fourth edge is a junction between the face image in the same orientation as the face image in which the first preset point is located and a face image in which the second target point is located; and a tenth determining unit, configured to determine the prediction motion vector based on a position vector from the fourth update point to the first preset point.

In another embodiment, the first preset point includes a central point of the prediction unit or a point in an upper left corner of the prediction unit.

In another embodiment, the second preset point includes a central point of the to-be-decoded unit or a point in an upper left corner of the to-be-decoded unit.

It should be noted that, for specific implementation of each unit, further correspondingly refer to the corresponding descriptions of the method embodiment shown in FIG. 9.

In the decoder 130 described in FIG. 13, the MV of the adjacent block determined based on the connection relationship in the M-hedron is often geometrically deformed. Therefore, when the prediction motion vector of the prediction unit herein (which is an adjacent block) is used to calculate the motion vector of the to-be-decoded unit, during use of the prediction motion vector, whether the prediction motion vector satisfies a condition for geometrical deformation is determined first. If the condition for geometrical deformation is satisfied, the first update is performed on the prediction motion vector, where the first update is used to determine the mapping vector that is of the prediction motion vector and that is in the plane of the face image in which the to-be-decoded unit is located. Then the motion vector of the to-be-decoded unit is calculated by using the prediction motion vector obtained after the first update, so that the calculated motion vector of the to-be-decoded unit is more accurate, thereby improving encoding efficiency.

Figure 14:
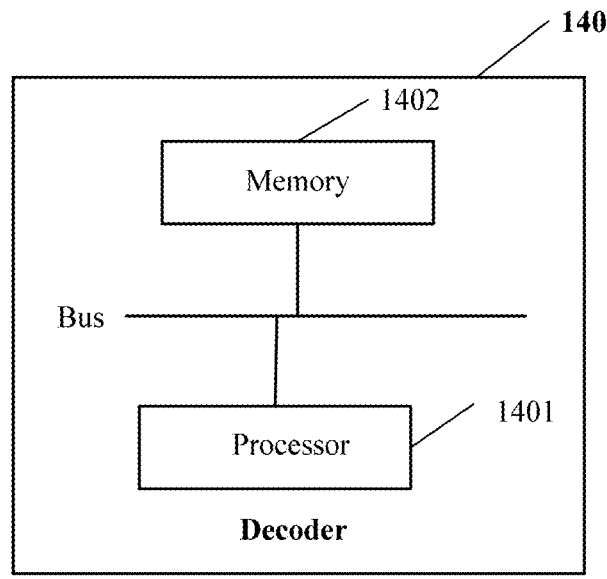
FIG. 14 is a schematic structural diagram of another decoder according to an embodiment of the present application.

FIG. 14 is a schematic structural diagram of another decoder 140 according to an embodiment of the present application. The decoder 140 includes a processor 1401 and a memory 1402. The processor 1401 is connected to the memory 1402 by using a bus.

The memory 1402 includes, but is not limited to, a random access memory (RAM), a read-only memory (ROM), an erasable programmable read-only memory (EPROM or flash memory), or a portable read-only memory (CD-ROM), and the memory 1402 is used for a related instruction and data.

The processor 1401 may be one or more central processing units 1401 (CPU). When the processor 1401 is one CPU, the CPU may be a single-core CPU or may be a multi-core CPU.

The processor 1401 in the decoder 140 is configured to read program code stored in the memory 1402, to perform the following operations:

determining a prediction motion vector of a to-be-decoded unit based on a motion vector of a prediction unit of the to-be-decoded unit; when a face image in which the to-be-decoded unit is located and at least one of a face image in which a first reference unit is located and a face image in which the prediction unit is located are not face images in a same orientation, performing a first update on the prediction motion vector, where the first update is used to determine a mapping vector that is of the prediction motion vector and that is in a plane of the face image in which the to-be-decoded unit is located, the first reference unit is determined based on the motion vector of the prediction unit and a reference image identifier of the prediction unit, the face image is a planar mapping image of a panorama image in an orientation, M face images form a closed M-hedron, a centroid of the M-hedron coincides with a centroid of an object using the panorama image as a surface, a line connecting the centroid of the M-hedron to a first position point on the face image intersects the panorama image at a second position point, the first position point is a mapping point of the second position point, and M is greater than or equal to 4; and obtaining a motion vector of the to-be-decoded unit based on the prediction motion vector obtained after the first update.

By performing the foregoing operations, an MV of an adjacent block determined based on a connection relationship in the M-hedron is often geometrically deformed. Therefore, when the prediction motion vector of the prediction unit herein (which is an adjacent block) is used to calculate the motion vector of the to-be-decoded unit, during use of the prediction motion vector, whether the prediction motion vector satisfies a condition for geometrical deformation is determined first. If the condition for geometrical deformation is satisfied, the first update is performed on the prediction motion vector, where the first update is used to determine the mapping vector that is of the prediction motion vector and that is in the plane of the face image in which the to-be-decoded unit is located. Then the motion vector of the to-be-decoded unit is calculated by using the prediction motion vector obtained after the first update, so that the calculated motion vector of the to-be-decoded unit is more accurate, thereby improving encoding efficiency.

In one embodiment, the prediction unit is a decoded unit determined, based on adjacency between the face images in the M-hedron, to be adjacent in space domain or time domain to the to-be-decoded unit.

In another embodiment, before performing the first update on the prediction motion vector, where the first update is used to determine the mapping vector that is of the prediction motion vector and that is in the plane of the face image in which the to-be-decoded unit is located, the processor 1401 is further configured to: determine, based on the prediction motion vector, a first corresponding point corresponding to a first preset point in the prediction unit, where the first corresponding point belongs to the first reference unit; and when a face image in which the first corresponding point is located and the face image in which the to-be-decoded unit is located are not face images in a same orientation, determine that the face image in which the first reference unit is located and the face image in which the to-be-decoded unit is located are not face images in a same orientation.

In another embodiment, the determining, by the processor 1401 based on the prediction motion vector, a first corresponding point corresponding to a first preset point in the prediction unit is: determining the first corresponding point in a reference image that is determined by using the reference image identifier, where a position vector from the first corresponding point to the first preset point is determined based on the motion vector of the prediction unit.

In another embodiment, before performing the first update on the prediction motion vector, where the first update is used to determine the mapping vector that is of the prediction motion vector and that is in the plane of the face image in which the to-be-decoded unit is located, the processor 1401 is further configured to: when a face image in which the first preset point is located and the face image in which the to-be-decoded unit is located are not face images in a same orientation, determine that the face image in which the to-be-decoded unit is located and the face image in which the prediction unit is located are not face images in a same orientation.

In another embodiment, the performing, by the processor 1401, a first update on the prediction motion vector, where the first update is used to determine a mapping vector that is of the prediction motion vector and that is in a plane of the face image in which the to-be-decoded unit is located is:

when the face image in which the to-be-decoded unit is located and the face image in which the first reference unit is located are not face images in a same orientation, and the face image in which the to-be-decoded unit is located and the face image in which the prediction unit is located are face images in a same orientation, determining, based on a position vector from the first preset point to a first update point, the prediction motion vector obtained after the first update;

when the face image in which the to-be-decoded unit is located and the face image in which the prediction unit is located are not face images in a same orientation, and the face image in which the to-be-decoded unit is located and the face image in which the first reference unit is located are face images in a same orientation, determining, based on a position vector from a second update point to the first corresponding point, the prediction motion vector obtained after the first update; or when the face image in which the to-be-decoded unit is located and each of the face image in which the first reference unit is located and the face image in which the prediction unit is located are not face images in a same orientation, determining, based on a position vector from a second update point to a first update point, the prediction motion vector obtained after the first update.

In another embodiment, before determining, based on the position vector from the first preset point to the first update point, the prediction motion vector obtained after the first update, or determining, based on the position vector from the second update point to the first update point, the prediction motion vector obtained after the first update, the processor 1401 is further configured to: obtain a first mapping point that is of the first corresponding point and that is on a surface of the M-hedron, where a distance from the first mapping point to a first edge of the M-hedron is equal to a distance from the first corresponding point to the first edge, and the first edge is a junction between a face image in which the first mapping point is located and a face image in a same orientation as the face image in which the to-be-decoded unit is located; and determine that an intersecting point between a line connecting the centroid of the M-hedron to the first mapping point and a plane of the face image in the same orientation as the face image in which the to-be-decoded unit is located is the first update point.

In another embodiment, before determining, based on the position vector from the second update point to the first corresponding point, the prediction motion vector obtained after the first update or determining, based on the position vector from the second update point to the first update point, the prediction motion vector obtained after the first update, the processor 1401 is further configured to: obtain a second mapping point that is of the first preset point and that is on the surface of the M-hedron, where a distance from the second mapping point to a second edge of the M-hedron is equal to a distance from the first preset point to the second edge, and the second edge is a junction between a face image in which the second mapping point is located and the face image in which the to-be-decoded unit is located; and determine that an intersecting point between a line connecting the centroid of the M-hedron to the second mapping point and a plane of the face image in which the to-be-decoded unit is located is the second update point.

In another embodiment, the obtaining, by the processor 1401, a motion vector of the to-be-decoded unit based on the prediction motion vector obtained after the first update is: using the prediction motion vector obtained after the first update, as the motion vector of the to-be-decoded unit.

In another embodiment, the obtaining, by the processor 1401, a motion vector of the to-be-decoded unit based on the prediction motion vector obtained after the first update is: using the prediction motion vector obtained after the first update, as a motion vector predictor of the to-be-decoded unit; parsing a data stream, to obtain a motion vector difference of the to-be-decoded unit, where the motion vector difference is used to represent a difference between the motion vector predictor of the to-be-decoded unit and the motion vector of the to-be-decoded unit; and obtaining the motion vector of the to-be-decoded unit based on the motion vector predictor of the to-be-decoded unit and the motion vector difference of the to-be-decoded unit.

In another embodiment, after obtaining the motion vector of the to-be-decoded unit based on the prediction motion vector obtained after the first update, the processor 1401 is further configured to: determine a second reference unit of the to-be-decoded unit based on the motion vector of the to-be-decoded unit; and when the face image in which the to-be-decoded unit is located and a face image in which the second reference unit is located are not face images in a same orientation, perform a second update on the motion vector of the to-be-decoded unit.

In another embodiment, before the performing a second update on the motion vector of the to-be-decoded unit, the decoder further includes: determining, based on the motion vector of the to-be-decoded unit, a second corresponding point corresponding to a second preset point in the to-be-decoded unit, where the second corresponding point belongs to the second reference unit; and when a face image in which the second corresponding point is located and the face image in which the to-be-decoded unit is located are not face images in a same orientation, determining that the face image in which the to-be-decoded unit is located and the face image in which the second reference unit is located are not face images in a same orientation.

In another embodiment, the performing, by the processor 1401, a second update on the motion vector of the to-be-decoded unit is: determining that an intersecting point between a line connecting the centroid of the M-hedron to the second corresponding point and the surface of the M-hedron is a first target point; obtaining a third update point that is of the first target point and that is in a plane of a face image in a same orientation as a face image in which the second preset point is located, where a distance from the third update point to a third edge of the M-hedron is equal to a distance from the first target point to the third edge, and the third edge is a junction between the face image in the same orientation as the face image in which the second preset point is located and a face image in which the first target point is located; and determining the prediction motion vector based on a position vector from the third update point to the second preset point.

In another embodiment, before performing the first update on the prediction motion vector, where the first update is used to determine the mapping vector that is of the prediction motion vector and that is in the plane of the face image in which the to-be-decoded unit is located, the processor 1401 is further configured to: determine that an intersecting point between a line connecting the centroid of the M-hedron to the first corresponding point and the surface of the M-hedron is a second target point; obtain a fourth update point that is of the second target point and that is in a plane of a face image in a same orientation as the face image in which the first preset point is located, where a distance from the fourth update point to a fourth edge of the M-hedron is equal to a distance from the second target point to the fourth edge, and the fourth edge is a junction between the face image in the same orientation as the face image in which the first preset point is located and a face image in which the second target point is located; and determine the prediction motion vector based on a position vector from the fourth update point to the first preset point.

In another embodiment, the first preset point includes a central point of the prediction unit or a point in an upper left corner of the prediction unit.

In another embodiment, the second preset point includes a central point of the to-be-decoded unit or a point in an upper left corner of the to-be-decoded unit.

It should be noted that, for specific implementation of each operation, further correspondingly refer to the corresponding descriptions of the method embodiment shown in FIG. 9.

In the decoder 140 described in FIG. 14, an MV of an adjacent block determined based on a connection relationship in the M-hedron is often geometrically deformed. Therefore, when the prediction motion vector of the prediction unit herein (which is an adjacent block) is used to calculate the motion vector of the to-be-decoded unit, during use of the prediction motion vector, whether the prediction motion vector satisfies a condition for geometrical deformation is determined first. If the condition for geometrical deformation is satisfied, the first update is performed on the prediction motion vector, where the first update is used to determine the mapping vector that is of the prediction motion vector and that is in the plane of the face image in which the to-be-decoded unit is located. Then the motion vector of the to-be-decoded unit is calculated by using the prediction motion vector obtained after the first update, so that the calculated motion vector of the to-be-decoded unit is more accurate, thereby improving encoding efficiency.

Figure 15:
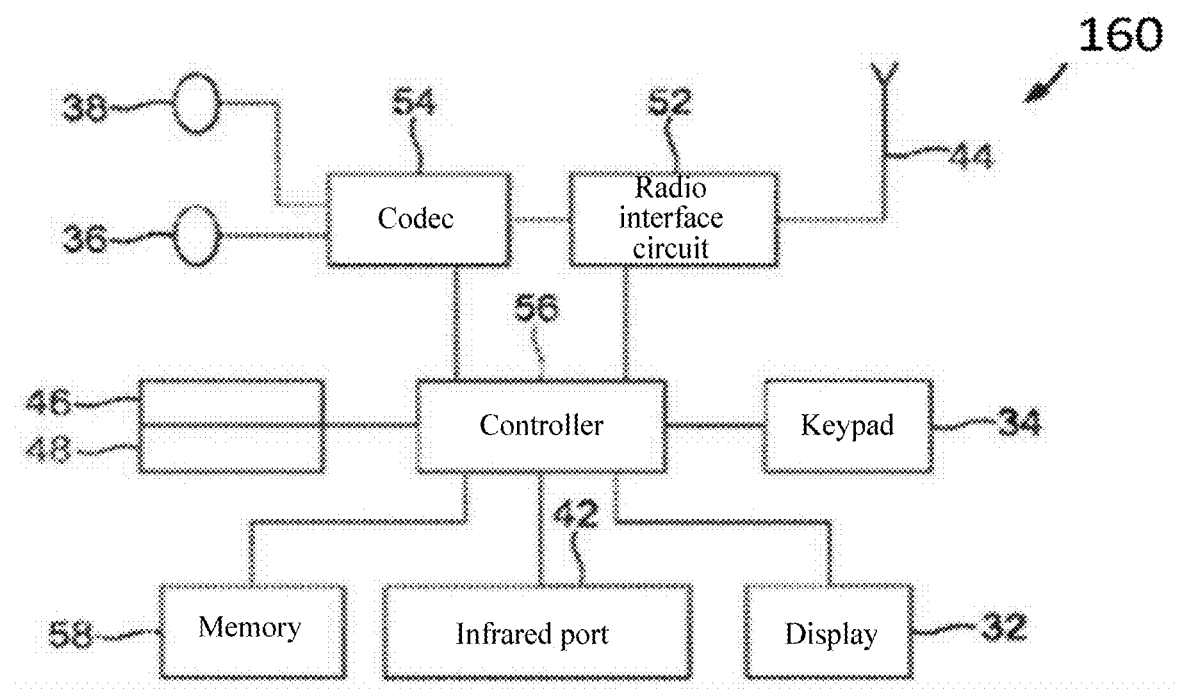
FIG. 15 is a schematic structural diagram of an apparatus according to an embodiment of the present application.

FIG. 15 is a schematic block diagram of a video encoding and decoding terminal or apparatus 160. The decoder 130 and the decoder 140 may be the terminal 160 or parts of the terminal 160. The apparatus 160 is configured to encode and decode, or encode, or decode a video image.

The apparatus 160 may include a housing 90 for incorporating and protecting the device. The apparatus 160 may further include a display 32 in a form of a liquid crystal display. In another embodiment of the present application, the display may be any suitable display technology suitable for displaying an image or a video. The apparatus 160 may further include a keypad 34. In another embodiment of the present application, any suitable data or user interface mechanism may be used. For example, the user interface can be implemented as a virtual keyboard or a data entry system as a part of a touch-sensitive display. The apparatus may include a microphone 36 or any suitable audio input. The audio input may be a digital or analog signal input. The apparatus 160 may further include the following audio output device. The audio output device may be any one of the following in this embodiment of the present application: an earphone 38, a speaker, or an analog audio or digital audio output connection. The apparatus 160 may further include a battery 40. In another embodiment of the present application, the device may be powered by any suitable mobile energy device, such as a solar cell, a fuel cell, or a clock mechanism generator. The apparatus may further include an infrared port 42 configured to perform near-field line of sight communication with another device. In another embodiment, the apparatus 160 may further include any suitable near-field communication solution such as a Bluetooth wireless connection or a USB/firewire wired connection.

The apparatus 160 may include a controller 56 or a processor configured to control the apparatus 160. The controller 56 may be connected to a memory 58. In this embodiment of the present application, the memory may store data in a form of an image or data in a form of an audio, and/or may also store an instruction to be implemented on the controller 56. The controller 56 may also be connected to a codec circuit 54 suitable for implementing encoding and decoding of audio and/or video data or assisted encoding and decoding implemented by the controller 56.

The apparatus 160 may further include a card reader 48 and a smart card 46, for example, a UICC and a UICC reader, configured to provide user information and suitable for providing authentication information for authenticating and authorizing a user on a network.

The apparatus 160 may further include a radio interface circuit 52. The radio interface circuit is connected to the controller and is suitable for generating, for example, a wireless communications signal for communicating with a cellular communications network, a wireless communications system, or a wireless local area network. The apparatus 160 may further include an antenna 44. The antenna is connected to the radio interface circuit 52 to send, to other (a plurality of) apparatuses, a radio frequency signal generated on the radio interface circuit 52 and receive a radio frequency signal from the other (the plurality of) apparatuses.

In some embodiments of the present application, the apparatus 160 includes a camera capable of recording or detecting single frames, and the codec 54 or the controller receives and processes the single frames. In some embodiments of the present application, the apparatus may receive to-be-processed video image data from another device before transmission and/or storage. In some embodiments of the present application, the apparatus 160 may receive images for encoding/decoding through a wireless or wired connection.

Figure 16:
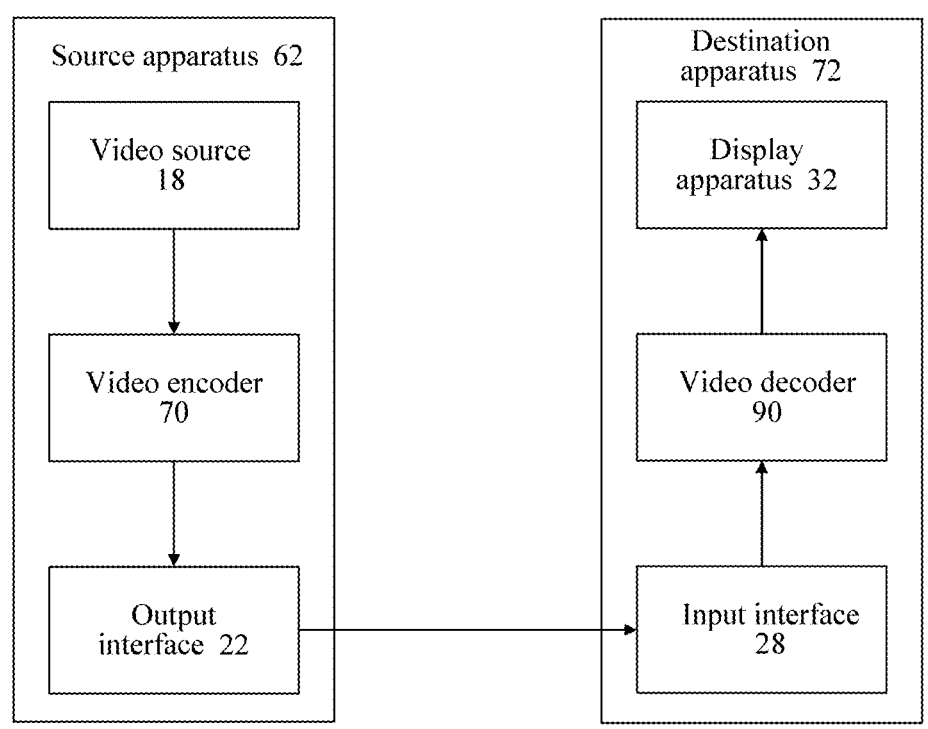
FIG. 16 is a schematic structural diagram of an encoder according to an embodiment of the present application.

FIG. 16 is a schematic block diagram of another video encoding and decoding system 170 according to an embodiment of the present application. As shown in FIG. 16, the video encoding and decoding system 170 includes a source apparatus 62 and a destination apparatus 72. The source apparatus 62 generates encoded video data. Therefore, the source apparatus 62 may be referred to as a video encoding apparatus or a video encoding device. The destination apparatus 72 may decode the encoded video data generated by the source apparatus 62. Therefore, the destination apparatus 72 may be referred to as a video decoding apparatus or a video decoding device. The source apparatus 62 and the destination apparatus 72 may be examples of a video encoding and decoding apparatus or a video encoding and decoding device. The source apparatus 62 and the destination apparatus 72 may include widespread apparatuses, including a desktop computer, a mobile computing apparatus, a notebook (for example, laptop) computer, a tablet computer, a set-top box, a handset such as a smartphone, a television, a camera, a display apparatus, a digital media player, a video game console, an in-vehicle computer, or other similar apparatuses. A terminal in the embodiments of the present application may be the source apparatus 62 or the destination apparatus 72.

The destination apparatus 72 may receive, through a channel 16, the encoded video data from the source apparatus 62. The channel 16 may include one or more media and/or apparatuses that can move the encoded video data from the source apparatus 62 to the destination apparatus 72. In an example, the channel 16 may include one or more communications media that enable the source apparatus 62 to directly transmit the encoded video data to the destination apparatus 72 in real time. In this example, the source apparatus 62 may modulate the encoded video data according to a communication standard (for example, a wireless communication protocol), and may transmit modulated video data to the destination apparatus 72. The one or more communications media may include a wireless and/or wired communications medium, for example, a radio frequency (RF) spectrum or one or more physical transmission lines. The one or more communications media may form a part of a packet-based network (for example, a local area network, a wide area network, or a global network (for example, the Internet)). The one or more communications media may include a router, a switcher, a base station, or another device facilitating communication from the source apparatus 62 to the destination apparatus 72.

In another example, the channel 16 may include a storage medium storing the encoded video data generated by the source apparatus 62. In this example, the destination apparatus 72 may access the storage medium through disk access or card access. The storage medium may include a plurality of types of local access-type data storage media such as Blu-ray, a DVD, a CD-ROM, or a flash memory, or another suitable digital storage medium configured to store the encoded video data.

In another example, the channel 16 may include a file server or another intermediate storage apparatus storing the encoded video data generated by the source apparatus 62. In this example, the destination apparatus 72 may access, through streaming transmission or downloading, the encoded video data stored in the file server or the another intermediate storage apparatus. The file server may be of a server type that can store the encoded video data and transmit the encoded video data to the destination apparatus 72. An example of the file server includes a web server (for example, used for a website), a File Transfer Protocol (FTP) server, a network attached storage (NAS) apparatus, and a local disk drive.

The destination apparatus 72 may access the encoded video data through a standard data connection (for example, an Internet connection). An example type of the data connection includes a wireless channel (for example, a Wi-Fi connection), a wired connection (for example, a DSL or a cable modem), or a combination thereof that are suitable for accessing the encoded video data stored in the file server. Transmission of the encoded video data from the file server may be streaming transmission, downloading transmission, or a combination thereof.

A technology of the present application is not limited to a wireless application scenario. For example, the technology may be applied to video encoding and decoding supporting a plurality of multimedia applications such as the following applications: over-the-air television broadcasting, cable television transmission, satellite television transmission, streaming-transmission video transmission (for example, through the Internet), encoding of video data stored in a data storage medium, decoding of video data stored in a data storage medium, or another application. In some examples, the video encoding and decoding system 170 may be configured to support unidirectional or bidirectional video transmission, to support applications such as video streaming transmission, video playback, video broadcasting, and/or videotelephony.

In the example in FIG. 16, the source apparatus 62 includes a video source 18, a video encoder 70, and an output interface 22. In some examples, the output interface 22 may include a modulator/demodulator (modem) and/or a transmitter. The video source 18 may include a video capturing apparatus (for example, a video camera), a video archive including pre-captured video data, a video input interface configured to receive video data from a video content provider, and/or a computer graphics system configured to generate video data, or a combination of the foregoing video data sources.

The video encoder 70 may encode video data from the video source 18. In some examples, the source apparatus 62 directly transmits the encoded video data to the destination apparatus 72 through the output interface 22. The encoded video data may be further stored in a storage medium or a file server, so that the destination apparatus 72 accesses the encoded video data later for decoding and/or playback.

In the example in FIG. 16, the destination apparatus 72 includes an input interface 28, a video decoder 90, and a display apparatus 32. In some examples, the input interface 28 includes a receiver and/or a modem. The input interface 28 may receive the encoded video data through the channel 16. The display apparatus 32 may be integrated with the destination apparatus 72 or may be outside the destination apparatus 72. Usually, the display apparatus 32 displays decoded video data. The display apparatus 32 may include a plurality of types of display apparatuses such as a liquid crystal display (LCD), a plasma display, an organic light-emitting diode (OLED) display, or a display apparatus of another type.

The video encoder 70 and the video decoder 90 may perform operations according to a video compression standard (for example, a high efficiency video coding and decoding H.265 standard), and may comply with an HEVC test model (HM).

Alternatively, the video encoder 70 and the video decoder 90 may perform operations according to another dedicated or industrial standard. The standard includes ITU-TH.261, ISO/IECMPEG-1Visual, ITU-TH.262 or ISO/IECMPEG-2Visual, ITU-TH.263, ISO/IECMPEG-4Visual, or ITU-TH.264 (which is also referred to as ISO/IECMPEG-4AVC), and includes Scalable Video Coding and Decoding (SVC) extension and Multiview Video Coding and Decoding (MVC) extension. It should be understood that the technology in the present application is not limited to any particular encoding and decoding standard or technology.

In addition, FIG. 16 is merely an example and the technology of the present application may be applied to a video encoding and decoding application that does not necessarily include any data communication between an encoding apparatus and a decoding apparatus (for example, one-sided video encoding or video decoding). In another example, a local memory is searched for data, the data is transmitted through streaming transmission in a network, or the data is operated in a similar manner. The encoding apparatus may encode data and store the data in a memory, and/or the decoding apparatus may search the memory for the data and decode the data. Usually, encoding and decoding are performed by a plurality of apparatuses that encode data only to a memory and/or retrieve data from a memory and decode data and that do not communicate with each other.

The video encoder 70 and the video decoder 90 may be separately implemented as any one of a plurality of suitable circuits, for example, one or more microprocessors, a digital signal processor (DSP), an application-specific integrated circuit (ASIC), a field programmable gate array (FPGA), discrete logic, hardware, or any combination thereof. If the technology is partially or entirely implemented by using software, the apparatus may store an instruction of the software in a suitable non-transitory computer-readable storage medium, and may execute the technology in the present application by using one or more processors by executing the instruction in the hardware. Any one of the foregoing (including hardware, software, a combination of hardware and software, and the like) may be considered as the one or more processors. Each of the video encoder 70 and the video decoder 90 may be included in one or more encoders or decoders. Any one of the video encoder 70 and the video decoder 90 may be integrated as a part of a combined encoder/decoder (codec (CODEC)) in another apparatus.

The present application can generally mean that the video encoder 70 "signals" a piece of information to another apparatus (for example, the video decoder 90). The term "signaling" may generally refer to communication of syntactic elements and/or the expression of encoded video data. The communication may happen in real time or approximately in real time. Alternatively, such communication may happen in a time span, for example, may happen when a syntactic element is stored in a computer-readable storage medium by using binary data obtained through encoding during encoding. After being stored in the medium, the syntactic element may be searched for by the decoding apparatus at any time.

In conclusion, by implementing the embodiments of the present application, the MV of the adjacent block determined based on the connection relationship in the M-hedron is often geometrically deformed. Therefore, when the prediction motion vector of the prediction unit herein (which is an adjacent block) is used to calculate the motion vector of the to-be-decoded unit, during use of the prediction motion vector, whether the prediction motion vector satisfies a condition for geometrical deformation is determined first. If the condition for geometrical deformation is satisfied, the first update is performed on the prediction motion vector, where the first update is used to determine the mapping vector that is of the prediction motion vector and that is in the plane of the face image in which the to-be-decoded unit is located. Then the motion vector of the to-be-decoded unit is calculated by using the prediction motion vector obtained after the first update, so that the calculated motion vector of the to-be-decoded unit is more accurate, thereby improving encoding efficiency.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

What is claimed is:

1. A motion vector decoding method, comprising:
   determining a prediction motion vector of a to-be-decoded unit based on a motion vector of a prediction unit of the to-be-decoded unit;
   when a face image in which the to-be-decoded unit is located and at least one of a face image in which a first reference unit is located and a face image in which the prediction unit is located are not face images in a same orientation, performing a first update on the prediction motion vector, wherein the first update is used to determine a mapping vector that is of the prediction motion vector and that is in a plane of the face image in which the to-be-decoded unit is located, the first reference unit is determined based on the motion vector of the prediction unit and a reference image identifier of the prediction unit, the face image is a planar mapping image of a panorama image in an orientation, M face images form a closed M-hedron, a centroid of the M-hedron coincides with a centroid of an object using the panorama image as a surface, a line connecting the centroid of the M-hedron to a first position point on the face image intersects the panorama image at a second position point, the first position point is a mapping point of the second position point, and M is greater than or equal to 4; and obtaining a motion vector of the to-be-decoded unit based on the prediction motion vector obtained after the first update.

2. The method according to claim 1, wherein the prediction unit is a decoded unit determined, based on adjacency between the face images in the M-hedron, to be adjacent in space domain or time domain to the to-be-decoded unit.

3. The method according to claim 1, further comprising:
before the performing a first update on the prediction motion vector, determining, based on the prediction motion vector, a first corresponding point corresponding to a first preset point in the prediction unit, wherein the first corresponding point belongs to the first reference unit; and
when a face image in which the first corresponding point is located and the face image in which the to-be-decoded unit is located are not face images in a same orientation, determining that the face image in which the first reference unit is located and the face image in which the to-be-decoded unit is located are not face images in a same orientation.

4. The method according to claim 3, wherein the determining, based on the prediction motion vector, a first corresponding point corresponding to a first preset point in the prediction unit comprises:
determining the first corresponding point in a reference image that is determined by using the reference image identifier, wherein a position vector from the first corresponding point to the first preset point is determined based on the motion vector of the prediction unit.

5. The method according to claim 3, wherein the performing a first update on the prediction motion vector comprises:
when the face image in which the to-be-decoded unit is located and the face image in which the first reference unit is located are not face images in a same orientation, and the face image in which the to-be-decoded unit is located and the face image in which the prediction unit is located are face images in a same orientation, determining, based on a position vector from the first preset point to a first update point, the prediction motion vector obtained after the first update;
when the face image in which the to-be-decoded unit is located and the face image in which the prediction unit is located are not face images in a same orientation, and the face image in which the to-be-decoded unit is located and the face image in which the first reference unit is located are face images in a same orientation, determining, based on a position vector from a second update point to the first corresponding point, the prediction motion vector obtained after the first update; or
when the face image in which the to-be-decoded unit is located and each of the face image in which the first reference unit is located and the face image in which the prediction unit is located are not face images in a same orientation, determining, based on a position vector from a second update point to a first update point, the prediction motion vector obtained after the first update.

6. The method according to claim 5, further comprising:
before the determining, based on a position vector from the first preset point to a first update point, the prediction motion vector obtained after the first update or the determining, based on a position vector from a second update point to a first update point, the prediction motion vector obtained after the first update, obtaining a first mapping point that is of the first corresponding point and that is on a surface of the M-hedron, wherein a distance from the first mapping point to a first edge of the M-hedron is equal to a distance from the first corresponding point to the first edge, and the first edge is a junction between a face image in which the first mapping point is located and a face image in a same orientation as the face image in which the to-be-decoded unit is located; and
determining that an intersecting point between a line connecting the centroid of the M-hedron to the first mapping point and a plane of the face image in the same orientation as the face image in which the to-be-decoded unit is located is the first update point.

7. The method according to claim 5, further comprising:
before the determining, based on a position vector from a second update point to the first corresponding point, the prediction motion vector obtained after the first update or the determining, based on a position vector from a second update point to a first update point, the prediction motion vector obtained after the first update, obtaining a second mapping point that is of the first preset point and that is on the surface of the M-hedron, wherein a distance from the second mapping point to a second edge of the M-hedron is equal to a distance from the first preset point to the second edge, and the second edge is a junction between a face image in which the second mapping point is located and the face image in which the to-be-decoded unit is located; and
determining that an intersecting point between a line connecting the centroid of the M-hedron to the second mapping point and a plane of the face image in which the to-be-decoded unit is located is the second update point.

8. The method according to claim 3, further comprising:
before the performing a first update on the prediction motion vector, determining that an intersecting point between a line connecting the centroid of the M-hedron to the first corresponding point and the surface of the M-hedron is a second target point;
obtaining a fourth update point that is of the second target point and that is in a plane of a face image in a same orientation as the face image in which the first preset point is located, wherein a distance from the fourth update point to a fourth edge of the M-hedron is equal to a distance from the second target point to the fourth edge, and the fourth edge is a junction between the face image in the same orientation as the face image in which the first preset point is located and a face image in which the second target point is located; and
determining the prediction motion vector based on a position vector from the fourth update point to the first preset point.

9. The method according to claim 3, wherein the first preset point comprises a central point of the prediction unit or a point in an upper left corner of the prediction unit.

10. The method according to claim 3, further comprising:
before performing the first update on the prediction motion vector, when a face image in which the first preset point is located and the face image in which the to-be-decoded unit is located are not face images in a same orientation, determining that the face image in which the to-be-decoded unit is located and the face image in which the prediction unit is located are not face images in a same orientation.

11. The method according to claim 1, wherein the obtaining a motion vector of the to-be-decoded unit based on the prediction motion vector obtained after the first update comprises:
using the prediction motion vector obtained after the first update, as the motion vector of the to-be-decoded unit.

12. The method according to claim 1, wherein the obtaining a motion vector of the to-be-decoded unit based on the prediction motion vector obtained after the first update comprises:
using the prediction motion vector obtained after the first update, as a motion vector predictor of the to-be-decoded unit;
parsing a data stream, to obtain a motion vector difference of the to-be-decoded unit, wherein the motion vector difference is used to represent a difference between the motion vector predictor of the to-be-decoded unit and the motion vector of the to-be-decoded unit; and
obtaining the motion vector of the to-be-decoded unit based on the motion vector predictor of the to-be-decoded unit and the motion vector difference of the to-be-decoded unit.

13. The method according to claim 1, further comprising:
after the obtaining a motion vector of the to-be-decoded unit based on the prediction motion vector obtained after the first update, determining a second reference unit of the to-be-decoded unit based on the motion vector of the to-be-decoded unit; and
when the face image in which the to-be-decoded unit is located and a face image in which the second reference unit is located are not face images in a same orientation, performing a second update on the motion vector of the to-be-decoded unit.

14. The method according to claim 13, further comprising:
before the performing a second update on the motion vector of the to-be-decoded unit, determining, based on the motion vector of the to-be-decoded unit, a second corresponding point corresponding to a second preset point in the to-be-decoded unit, wherein the second corresponding point belongs to the second reference unit; and
when a face image in which the second corresponding point is located and the face image in which the to-be-decoded unit is located are not face images in a same orientation, determining that the face image in which the to-be-decoded unit is located and the face image in which the second reference unit is located are not face images in a same orientation.

15. The method according to claim 14, wherein the second preset point comprises a central point of the to-be-decoded unit or a point in an upper left corner of the to-be-decoded unit.

16. The method according to claim 13, wherein the performing a second update on the motion vector of the to-be-decoded unit comprises:
determining that an intersecting point between a line connecting the centroid of the M-hedron to the second corresponding point and the surface of the M-hedron is a first target point;
obtaining a third update point that is of the first target point and that is in a plane of a face image in a same orientation as a face image in which the second preset point is located, wherein a distance from the third update point to a third edge of the M-hedron is equal to a distance from the first target point to the third edge, and the third edge is a junction between the face image in the same orientation as the face image in which the second preset point is located and a face image in which the first target point is located; and
determining the prediction motion vector based on a position vector from the third update point to the second preset point.

17. A decoder, comprising:
a non-transitory memory having processor-executable instructions stored thereon; and
a processor, coupled to the non-transitory memory, configured to execute the processor-executable instructions to facilitate:
determining a prediction motion vector of a to-be-decoded unit based on a motion vector of a prediction unit of the to-be-decoded unit;
when a face image in which the to-be-decoded unit is located and at least one of a face image in which a first reference unit is located and a face image in which the prediction unit is located are not face images in a same orientation, performing a first update on the prediction motion vector, wherein the first update is used to determine a mapping vector that is of the prediction motion vector and that is in a plane of the face image in which the to-be-decoded unit is located, the first reference unit is determined based on the motion vector of the prediction unit and a reference image identifier of the prediction unit, the face image is a planar mapping image of a panorama image in an orientation, M face images form a closed M-hedron, a centroid of the M-hedron coincides with a centroid of an object using the panorama image as a surface, a line connecting the centroid of the M-hedron to a first position point on the face image intersects the panorama image at a second position point, the first position point is a mapping point of the second position point, and M is greater than or equal to 4; and
obtaining a motion vector of the to-be-decoded unit based on the prediction motion vector obtained after the first update.

18. The decoder according to claim 17, wherein the prediction unit is a decoded unit determined, based on adjacency between the face images in the M-hedron, to be adjacent in space domain or time domain to the to-be-decoded unit.

19. The decoder according to claim 17, wherein the processor is configured to execute the processor-executable instructions to further facilitate:
before the first update is performed on the prediction motion vector, wherein the first update is used to determine the mapping vector that is of the prediction motion vector and that is in the plane of the face image in which the to-be-decoded unit is located, determining, based on the prediction motion vector, a first corresponding point corresponding to a first preset point in the prediction unit, wherein the first corresponding point belongs to the first reference unit; and
when a face image in which the first corresponding point is located and the face image in which the to-be-decoded unit is located are not face images in a same orientation, determining that the face image in which the first reference unit is located and the face image in which the to-be-decoded unit is located are not face images in a same orientation.

20. The decoder according to claim 19, wherein the processor is configured to execute the processor-executable instructions to further facilitate: determining the first corresponding point in a reference image that is determined by using the reference image identifier, wherein a position vector from the first corresponding point to the first preset point is determined based on the motion vector of the prediction unit.

* * * * *